United States Patent
Kumagai et al.

(10) Patent No.: US 12,514,900 B2
(45) Date of Patent: *Jan. 6, 2026

(54) METHOD TO IDENTIFY RESPONDERS TO OSTEOARTHRITIS THERAPEUTICS

(71) Applicant: OrthoTrophix, Inc., Foster City, CA (US)

(72) Inventors: Yoshinari Kumagai, Foster City, CA (US); Dawn McGuire, Orinda, CA (US); Meghan Miller, Antioch, CA (US); David Rosen, New Braunfels, TX (US)

(73) Assignee: OrthoTrophix, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,551

(22) Filed: Sep. 27, 2021

(65) Prior Publication Data

US 2022/0226433 A1 Jul. 21, 2022

Related U.S. Application Data

(60) Provisional application No. 63/239,793, filed on Sep. 1, 2021, provisional application No. 63/239,791, filed on Sep. 1, 2021, provisional application No. 63/219,060, filed on Jul. 7, 2021, provisional application No. 63/086,334, filed on Oct. 1, 2020.

(51) Int. Cl.
| | | |
|---|---|---|
| *A61K 38/16* | (2006.01) | |
| *A61B 5/00* | (2006.01) | |
| *A61B 5/055* | (2006.01) | |
| *A61B 6/03* | (2006.01) | |
| *A61B 6/50* | (2024.01) | |
| *A61B 8/08* | (2006.01) | |
| *A61K 9/00* | (2006.01) | |
| *A61K 38/18* | (2006.01) | |
| *A61P 19/02* | (2006.01) | |

(52) U.S. Cl.
CPC .............. *A61K 38/16* (2013.01); *A61B 5/055* (2013.01); *A61B 5/4504* (2013.01); *A61B 5/4848* (2013.01); *A61B 6/032* (2013.01); *A61B 6/505* (2013.01); *A61B 8/0875* (2013.01); *A61K 9/0019* (2013.01); *A61K 38/18* (2013.01); *A61P 19/02* (2018.01)

(58) Field of Classification Search
None
See application file for complete search history.

(56) References Cited

U.S. PATENT DOCUMENTS

| | | |
|---|---|---|
| 7,638,486 B2 | 12/2009 | Lazarov et al. |
| 7,888,462 B2 | 2/2011 | Middleton-Hardie |
| 8,426,558 B2 | 4/2013 | Middleton-Hardie |
| 8,426,588 B2 | 4/2013 | Makino |
| 11,278,413 B1* | 3/2022 | Lang .......................... A61F 2/40 |
| 11,793,857 B2* | 10/2023 | Kumagai ............. A61B 5/4848 |
| 11,963,996 B2* | 4/2024 | Kumagai ........... A61K 38/1709 |
| 12,303,590 B2* | 5/2025 | Kumagai ................ A61P 19/02 |
| 2002/0147392 A1 | 10/2002 | Steines et al. |
| 2008/0096798 A1 | 4/2008 | Lazarov et al. |
| 2009/0062201 A1 | 3/2009 | Kumagai et al. |
| 2011/0105401 A1 | 5/2011 | Middleton-Hardie et al. |
| 2011/0202032 A1 | 8/2011 | Shih et al. |
| 2011/0266265 A1* | 11/2011 | Lang .......................... A61F 2/38 219/121.72 |
| 2016/0296692 A1 | 10/2016 | Agris, III et al. |
| 2019/0388503 A1* | 12/2019 | Kumagai .................. A61K 9/19 |
| 2020/0002393 A1 | 1/2020 | Kumagai et al. |
| 2020/0009220 A1 | 1/2020 | Kumagai |
| 2020/0129588 A1 | 4/2020 | Kumagai |
| 2020/0170939 A1 | 6/2020 | Kumagai |
| 2022/0133484 A1* | 5/2022 | Lang ...................... G16H 20/40 623/19.11 |

FOREIGN PATENT DOCUMENTS

| | | |
|---|---|---|
| WO | WO 2008/091632 | 7/2008 |
| WO | WO 2010/018407 A1 | 2/2010 |
| WO | WO 2020117360 | 6/2020 |

OTHER PUBLICATIONS

WOMAC Osteoarthritis Index from bites:/Asayw.physio-gediacomAVOMAC Osteoarthritis Index, pp. 1-6. Accessed Mar. 29, 2020 (Year:2020) (cited in IDS of Apr. 6, 2022 IDS).*
Bowes et al. Machine Learning Defines the Relationship Between Structural Knee Osteoarthritis and Patient-Important Outcomes: An 8-year Study of 47,858 Knee MRIs from the Osteoarthritis Initiative (OAI) [Abstract No. 2196]. Arthritis Rheumatol. 2019; 71 (suppl 10). https://acrabstracts.org/abstract/ machine-learning-defines-the-relationship-between-structural-knee-osteoarthritis-and-patient-important-outcomes-an-8- year-study-of-47858-knee-mris-from-the-osteoarthritis-initiative-oai/.*
AC-100 from https://www.drubank.ca.drugs/DB05671, pp. 1-3. Accessed Apr. 4, 2020 (Year 2020).
Bork, "Powers and Pitfalls in Sequence Analysis: The 70% Hurdle." Genome Research 10:398-400 (2000).
Bowie et al., "Deciphering the Message in Protein Sequences: Tolerance to Amino Acid Substitutions" Science, 247:1306-1310 (1990).
Burgess et al, "Possible Dissociation of the Heparin-binding and Mitogenic Activities of Heparin-binding (Acidic Fibroblast) Growth Factor-1 from Its Receptor-binding Activities by Site-Directed Mutagenesis of a Single Lysine Residue" J. Cell Biol. 111:2129-2138.
Christensen et al., "FAM20C-Mediated Phosphorylation of MEPE and Its Acidic Serine- and Aspartate-Rich Motif" JBMRPlus (WOA) 4(8):1-8 (Aug. 2020).

(Continued)

*Primary Examiner* — Maury A Audet
(74) *Attorney, Agent, or Firm* — Andrew R. Guzman; Bozicevic, Field & Francis LLP

(57) ABSTRACT

A diagnostic and a method of treatment are disclosed whereby the diagnostic identifies patients more likely to respond to a therapeutic intervention thereby improving clinical benefits including improved joint function, reduced pain, and other clinical symptoms.

5 Claims, 12 Drawing Sheets

Specification includes a Sequence Listing.

(56) References Cited

OTHER PUBLICATIONS

Knee Injury and Osteoarthritis Outcome Score from https://www.physio-pedia.com/KneePInjury_Osteoarthritis_Outcome_Score, pp. 1-8. Accessed Mar. 29, 2020 (Year 2020).
Lazar et al., "Transforming Growth Factor ox: Mutation of Aspartic Acid 47 and Leucine 48 Results in Different Biological Activities" Mol. Cell Biol., 8:1247-1252 (1988).
Li et al., "Subchondral bone in osteoarthritis: insight into risk factors and microstructural changes" Arthritis Research & Therapy, 15:233, pp. 1-12 (2013).
Maheswaran et al. "A Study to Investigate the Osteogenic Potential of Peptide AC-100," EC Orthopaedics, Jan. 31, 2017 (Jan. 31, 2017), vol. 5, Iss. 3, pp. 82-87.
Roemer et al. "An illustrative overview of semi-quantitative MRI scoring of knee osteoarthritis: lessons learned from longitudinal observational studies" Osteoarthritis and Cartilage 24:274e289 275 (2016) (Year: 2016).
Rowe et al. "MEPE has the properties of an osteoblastic phosphatonin and minhibin," Bone, Nov. 26, 2003 (Nov. 26, 2003), vol. 34, Iss. 2, pp. 303-319.
Vincent, G. et al. "Fully Automatic Segmentation of the Knee Joint using Active Appearance Models. Medical Image Analysis for the Clinic: A Grand Challenge." 210:224-30.
WOMAC Osteoarthritis Index from https://www.physio-pedia.com/WOMAC Osteoarthritis Index, pp. 1-6. Accessed Mar. 29, 2020 (Year: 2020).
"Cartilage Protection and Formation Have Failed to Move DMOAD Development Forward" OrthoTrophix, 1 page (2021).
"Guidance for Industry, Clinical Development Programs for Drugs, Devices, and Biological Products Intended for the Treatment of Osteoarthritis (OA)" U.S. Department of Health and Human Services, Food and Drug Administration, Center for Drug Evaluation and Research (CDER), Center for Biologics Evaluation and Research (CBER), Center for Device and Radiological Health (CDRH) (Jul. 1999) 12 pages.
Hochberg, et. al., "Efficacy and Safety of Intra-Articular Sprifermin in Symptomatic Radiographic Knee Osteoarthritis: Results of the 2-Year Primary Analysis from a 5-Year Randomised, Placebo-Controlled, Phase II Study" 2017 ACR/ARHP Annual Meeting (Oct. 19, 2017) Abstract No. 1L, 4 pages.
Hochberg, et. al., "Efficacy and Safety of Intra-articular Sprifermin in Symptomatic Radiographic Knee Osteoarthritis: Pre-specified Analysis of 3-Year Data from a 5-Year Randomized, Placebo-Cotnrolled, Phase II Study" Osteoarthritis and Cartilage (2018) 26:S26-S27) Abstract No. 32.
"Osteoarthritis: Structural Endpoints for the Developments of Drugs, Devices, and Biological Products for Treatment, Guidance for Industry" U.S. Department of Health and Human Services, Food and Drug Administration, Center for Drug Evaluation and Research (CDER), Center for Biologics Evaluation and Research (CBER), Center for Device and Radiological Health (CDRH) (Aug. 2018) 6 pages.
"Patella Cartilage Thickness Change from Baseline" and "Tibiofemoral Cartilage Thickness Change from Baseline" OrthoTrophix (2021).
Karsdal et al., "Disease-modifying treatments for osteoarthritis (DMOADs) of the knee and hip: lessons learned from failures and opportunities for the future" Osteoarthritis and Cartilage (2016) 24(12)2013-2021.
McGuire et al., "TPX-100 Leads to the Marked, Sustained Improvements in Subjects with Kneww Osteoarthritis: Pre-Clinical Rationale and Results of a Controlled Clinical Trial" Osteoarthritis and Cartilage (2018) 26(1):5243.

Walsh et al., "Treating People With Joint Pain" International Association for the Study of Pain (2016) pp. 1-4.
McGuire et al. "Significant, Sustained Improvement in Knee Function after Intra-Articular TPX-100: A Double-Blind, Randomized, Multi-Center, Placebo-Controlled Phase 2 Trail." 2017 ACR Poster.
McGuire et al. "TPX-100 Leads to Marked, Sustained improvements in Subjects with Knee Osteoarthritis: Pre-Clinical Rationale and Results of a Controlled Clinical Trial" 2018 OARSI Poster.
McGuire et al. "Improved Knee Physical Function Correlates Significant with TF Cartilage Thickness Increase after IA TPX-100: Results of a Post Hoc Analysis" 2019 EULAR Abstract.
McGuire et al. "Improved Knee Physical Function Correlates Significantly with TF Cartilage Thickness after IA TPX-100: Results of a Post Hoc Analysis" 2019 EULAR Poster.
McGuire et al. "Study TPX-100-5: Intra-articular TPX-100 Significantly Delays Pathological Bone Shape Change at 6 and 12 Months in Moderate and Sever Tibiofemoral OA" 2019 ACR Bone Shape Poster.
McGuire et al. "Stabilization of Patellar Bone-Shape Correlates Significantly with Reduced Knee Pain Frequency After IA TPX-100 in Subjects with Bilateral Patellofemoral OA" 2019 ACR Pain Abstract.
McGuire et al. "Stabilization of Patellar Bone-Shape Correlates Significantly with Reduced Knee Pain Frequency after IA TPX-100 in Subjects with Bilateral Patellofemoral OA" 2019 ACR Pain Poster.
McGuire et al. "Study TPX-100-5: Intra-Articular TPX-100 Significantly Delays Pathological Bone Shape Change and Stabilizes Cartilage in Moderate to Sever Bilateral Knee OA" 2021 ART Paper.
Hu et al., "Joint level-set shape modeling and appearance modeling for brain structure segmentation" NeuroImage, 36:672-683 (2007).
McGuire, "TPX-100 Leads to Marked, Sustained improvements in Subjects with Knee Osteoarthritis: Pre-Clinical Rationale and Results of a Controlled Clinical Trial" Abstracts for Osteoarthritis and Cartilage, 26:#463 (2018).
Neogi et al., "MRI-based three dimensional bone shape of the knee predicts onset of knee osteoarthritis: Data from the Osteoarthritis Initiative" Arthritis Rheum, 65(8):2048-2058 (2013).
Orthotrophix, "A Randomized, Double-blind, Placebo-controlled, Multi-dose Phase 2 Study Evaluating the Safety and Efficacy of Intra-articular Injections of TPX-100 in Subjects with Mild to Moderate Patello-Femoral Osteoarthritis Involving Both Knees," Dialog, NCT01925261 (Aug. 15, 2013).
Perry et al., "Measurement of synovial tissue volume in knee osteoarthritis using a semiautomated MRI-based quantitative approach" Magn Reason Med, 81:3056-3064 (2019).
Sayre et al., PLOS One, May 4, 2017, 12(5):e0176833.
Chinese Office Action dated Jan. 25, 2024, from corresponding Chinese Patent Application No. 201980079767.9.
European Communication dated Aug. 24, 2024, from corresponding European Patent Application No. 18816758.9.
European Search Report dated Sep. 26, 2024, from corresponding European Patent Application No. 24179087.2.
International Search Report dated Dec. 7, 2021, from corresponding International Patent Application No. PCT/US2021/050934.
International Search Report dated Mar. 1, 2022, from corresponding International Patent Application No. PCT/US2021/052226.
Hayashi et al., "Imaging for Osteoarthritis" Annals of Physical and Rehabilitation Medicine, 2016, vol. 59:161-169.
Bowes et al. "A Novel Method for Bone Area Measurement Provides New Insights into Osteoarthritis and it's Progression" Ann Rheum Dis Mar. 2015; 74(3) p. 519-525.

* cited by examiner

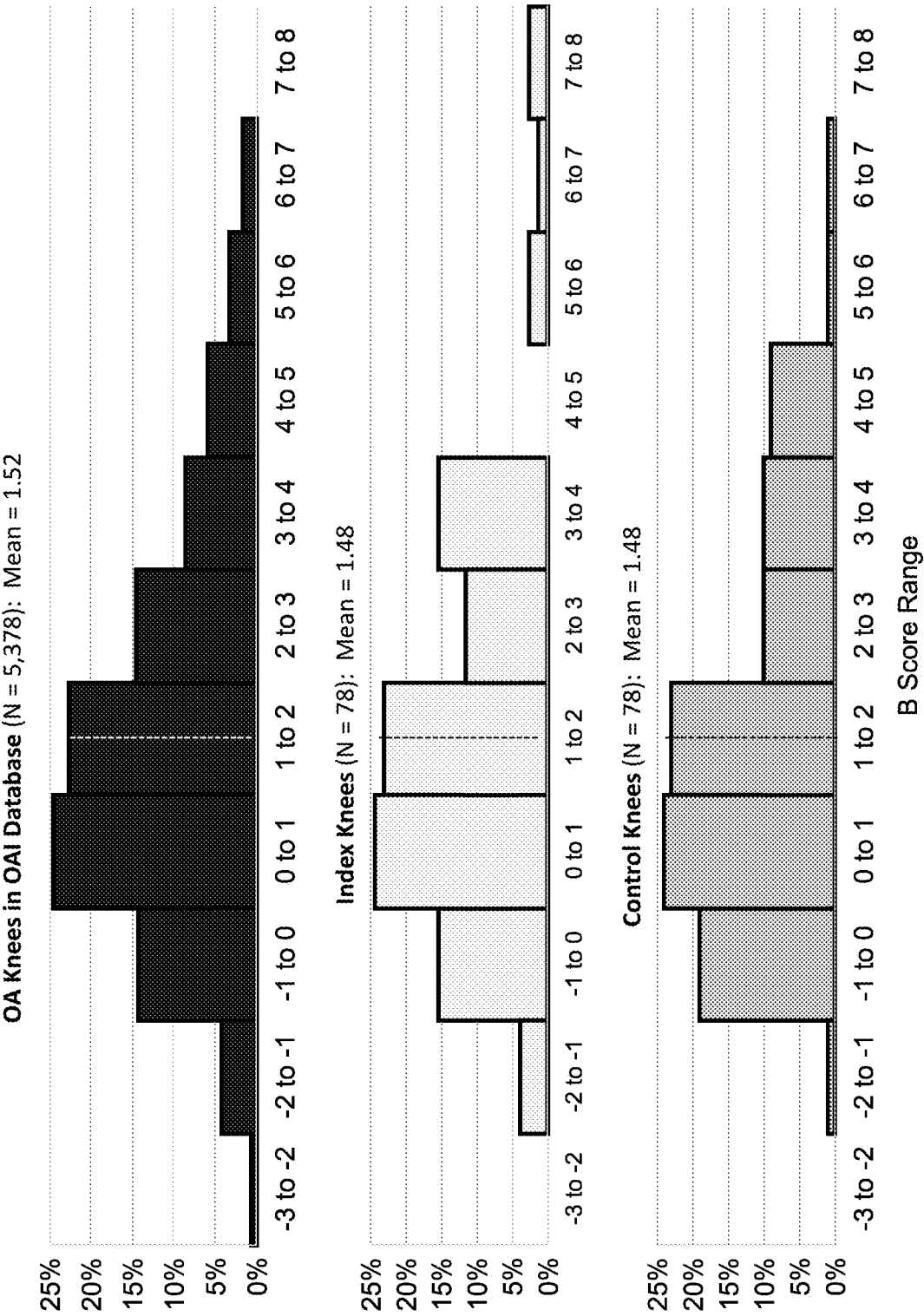
Figure 1: Baseline B Score Distributions

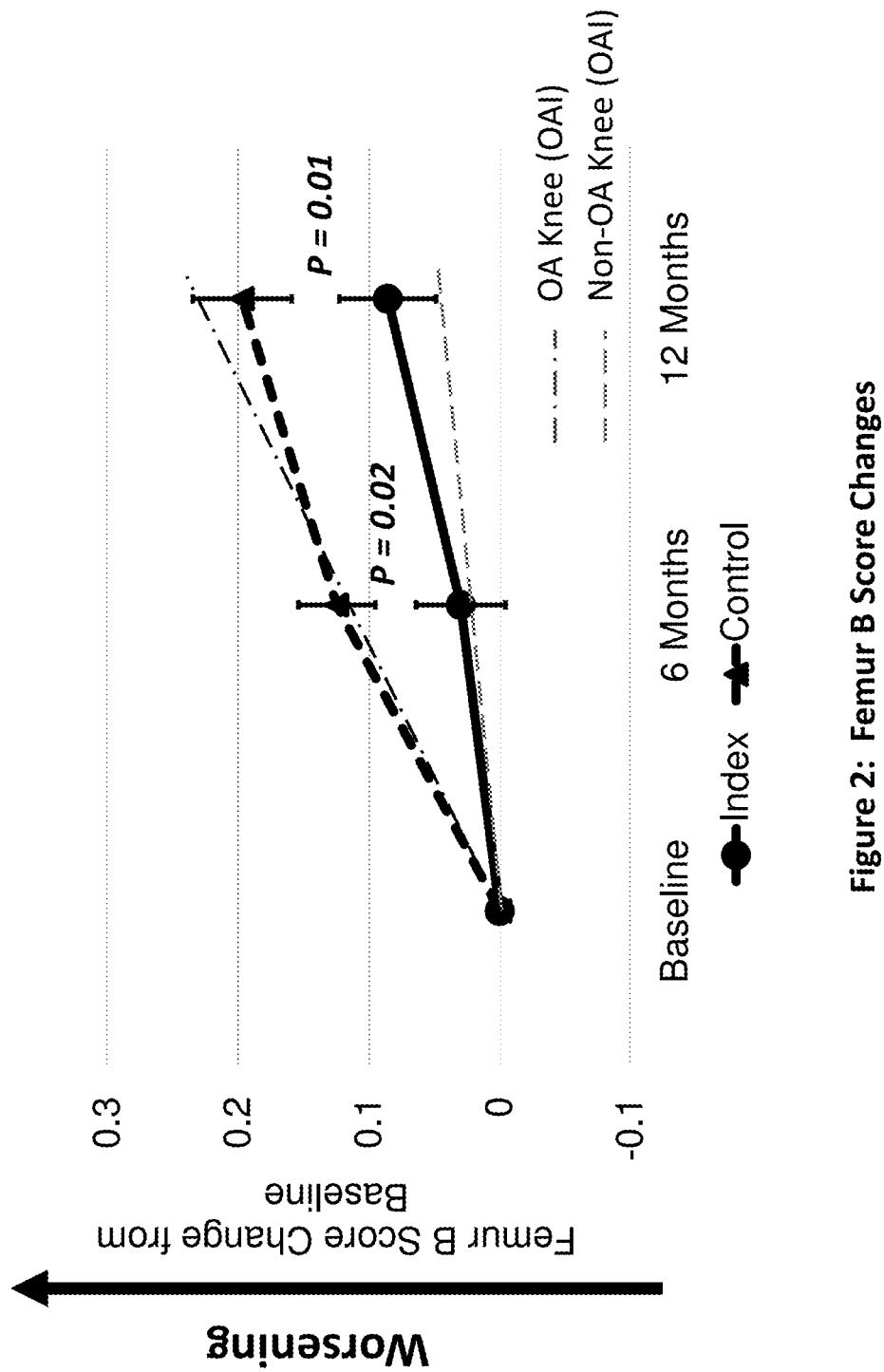
Figure 2: Femur B Score Changes

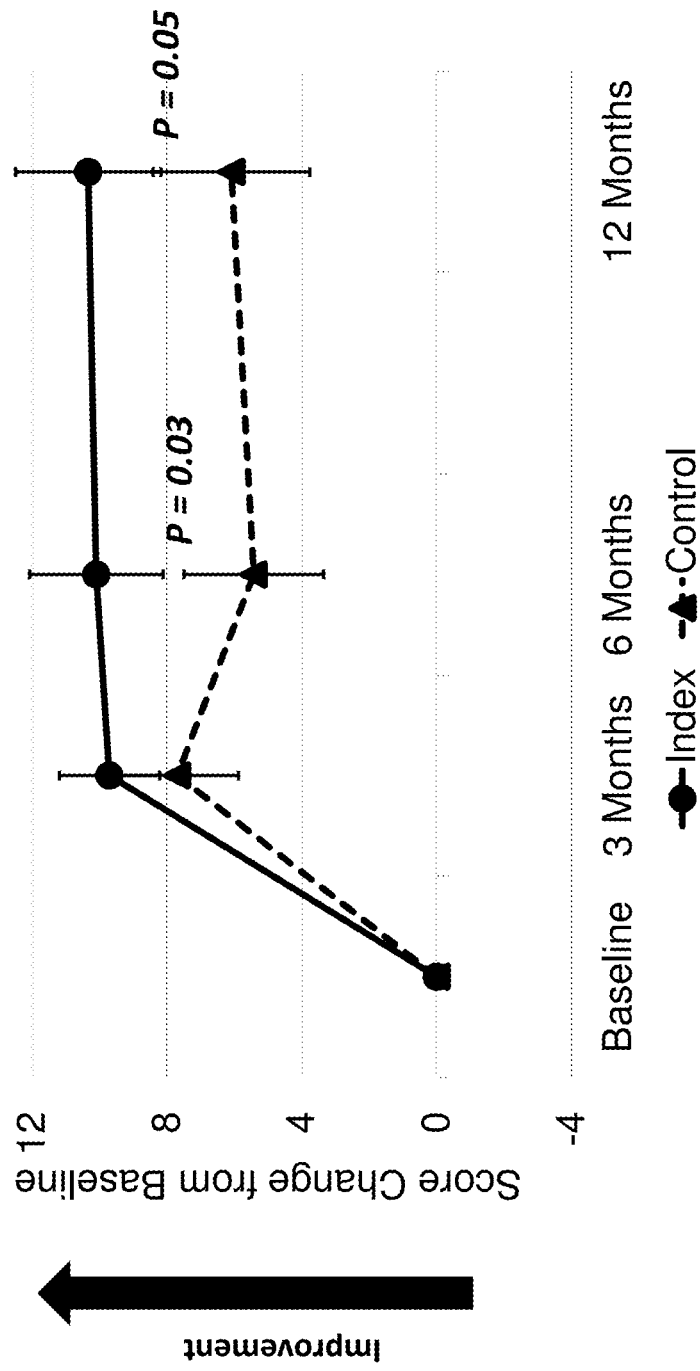
Figure 3: KOOS ADL / WOMAC Function

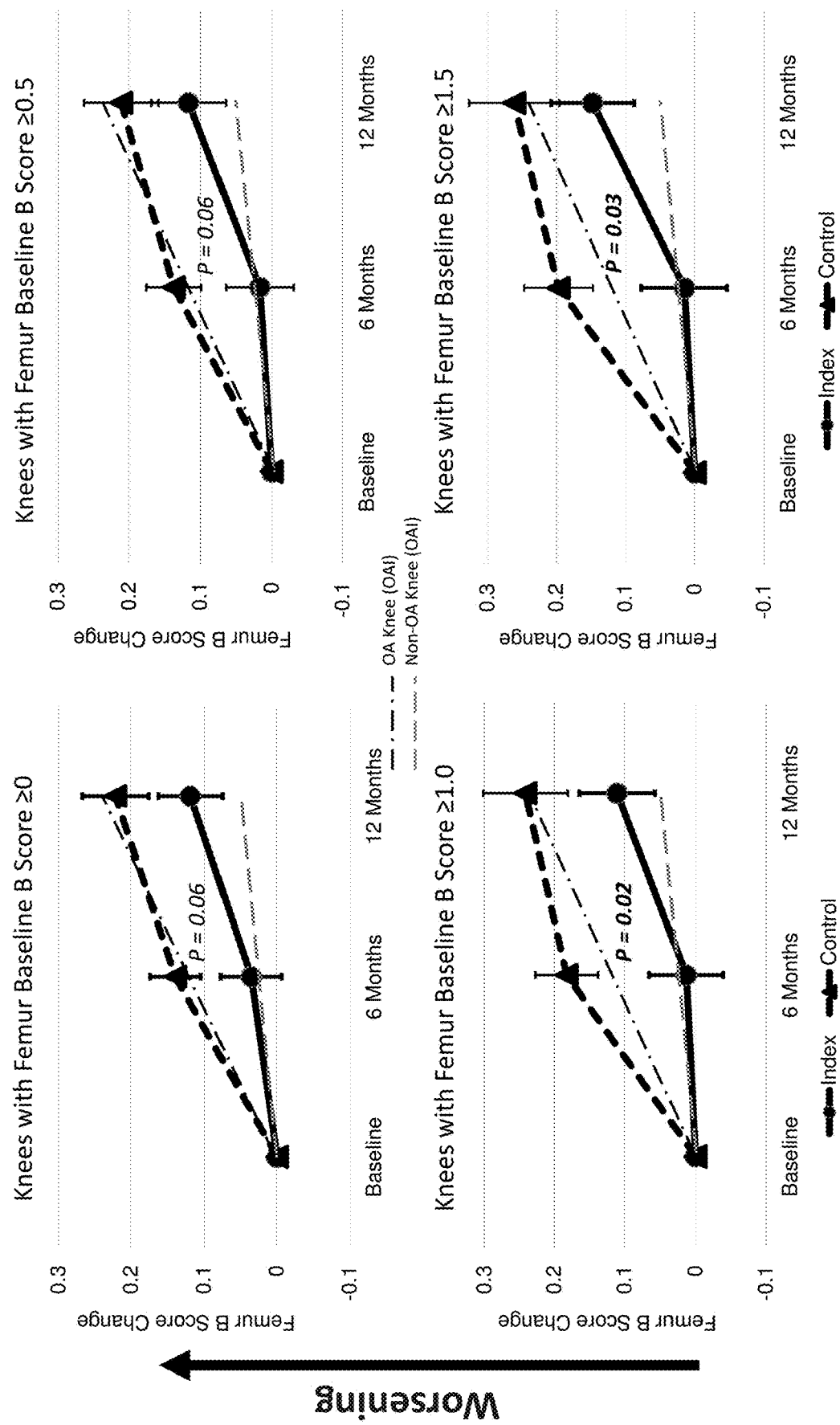
Figure 4: Femur B Score Changes in Index and Control Knees

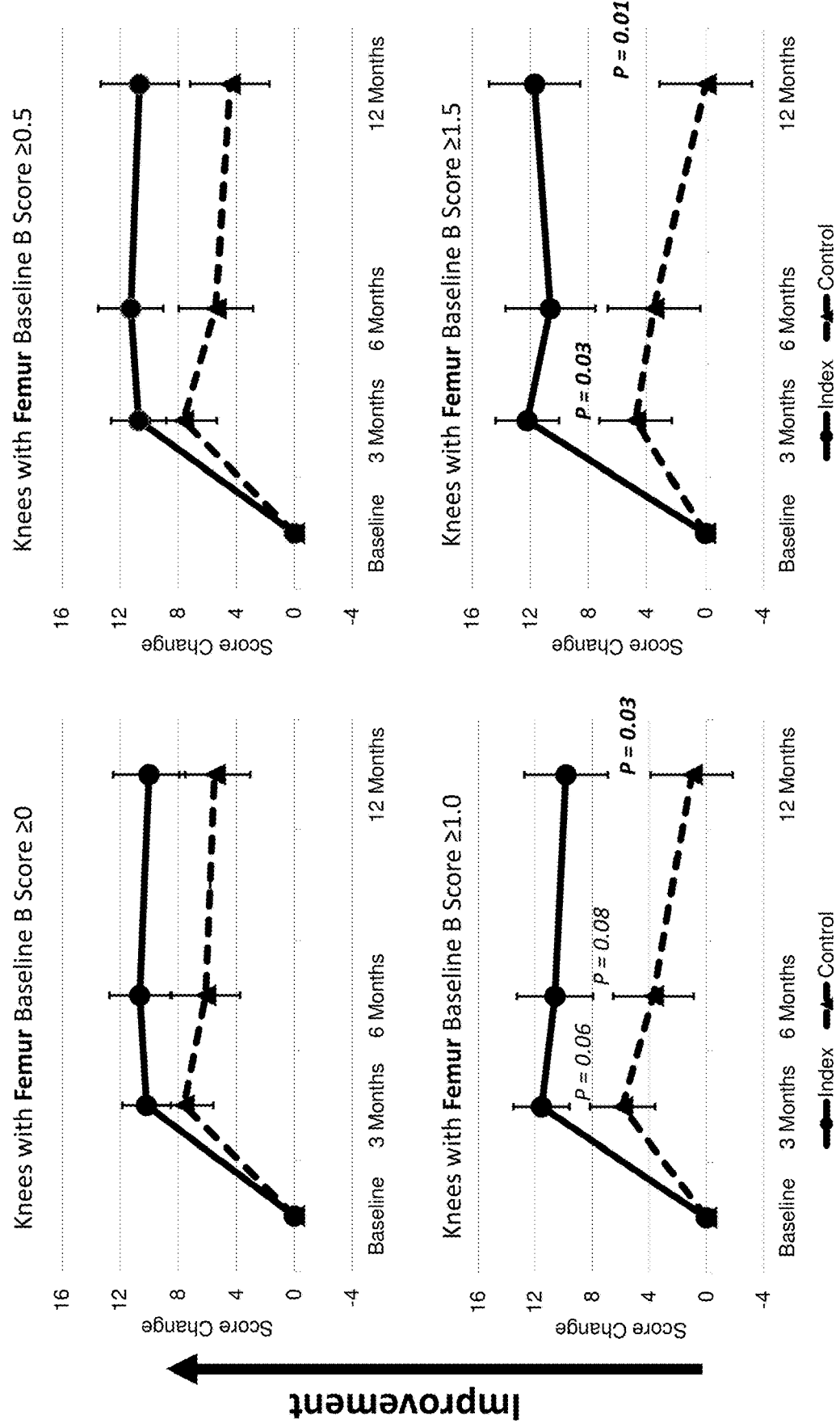
Figure 5: KOOS ADL/WOMAC Function Improvements in Multiple Femur Baseline B Score Cohorts

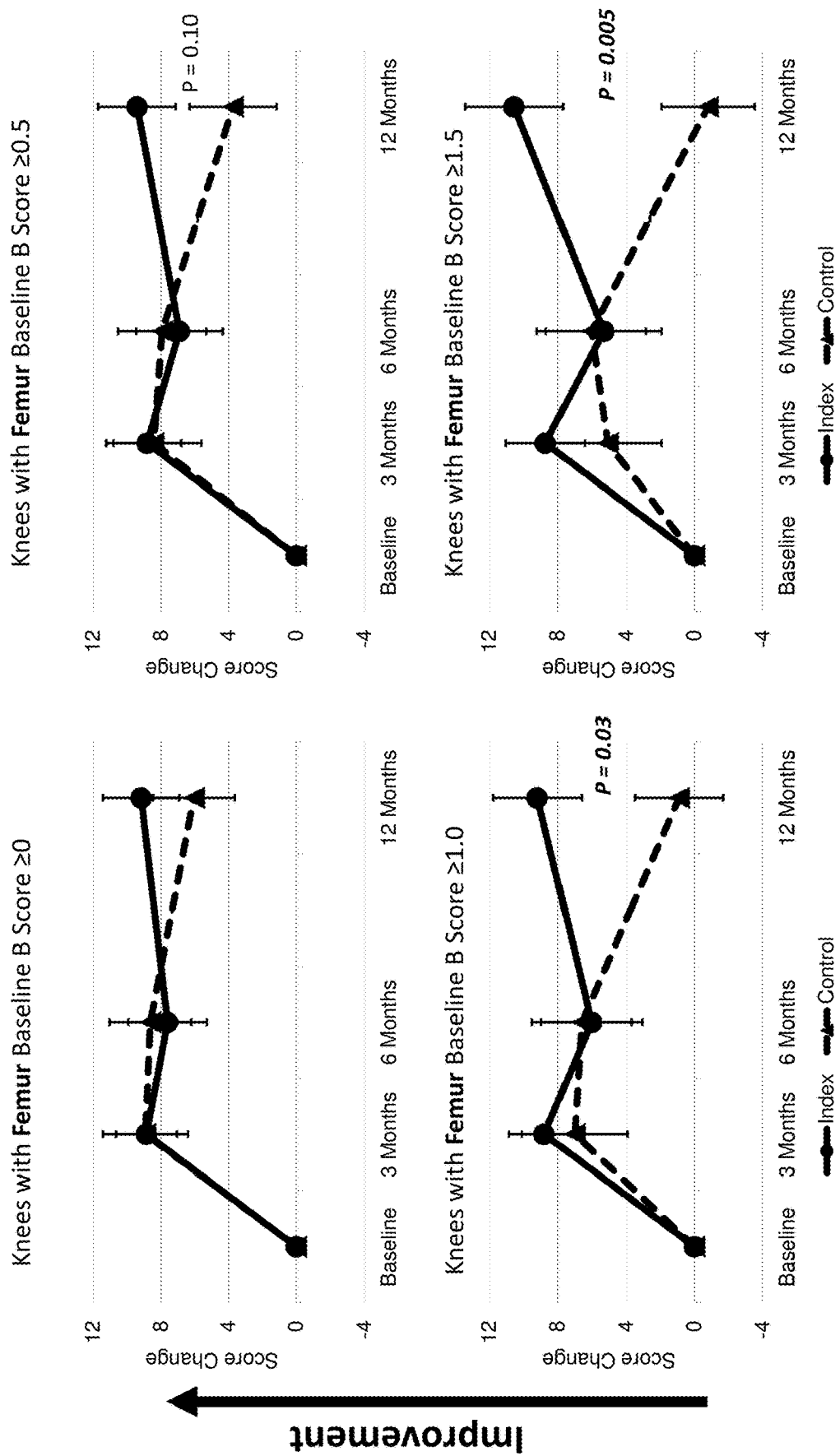
Figure 6: KOOS Pain Improvements in Multiple Femur Baseline B Score Cohorts

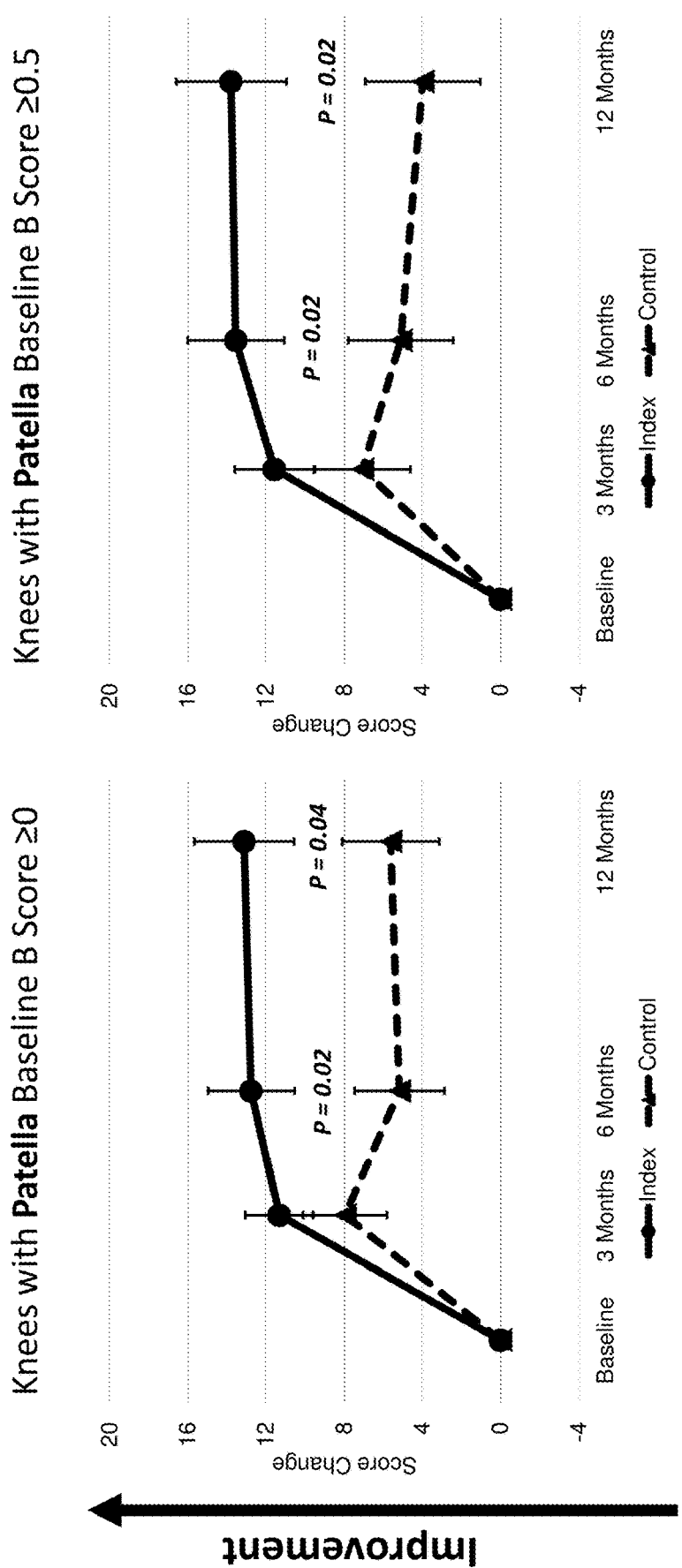
Figure 7: KOOS ADL/WOMAC Function Improvements in Multiple Patella Baseline B Score Cohorts

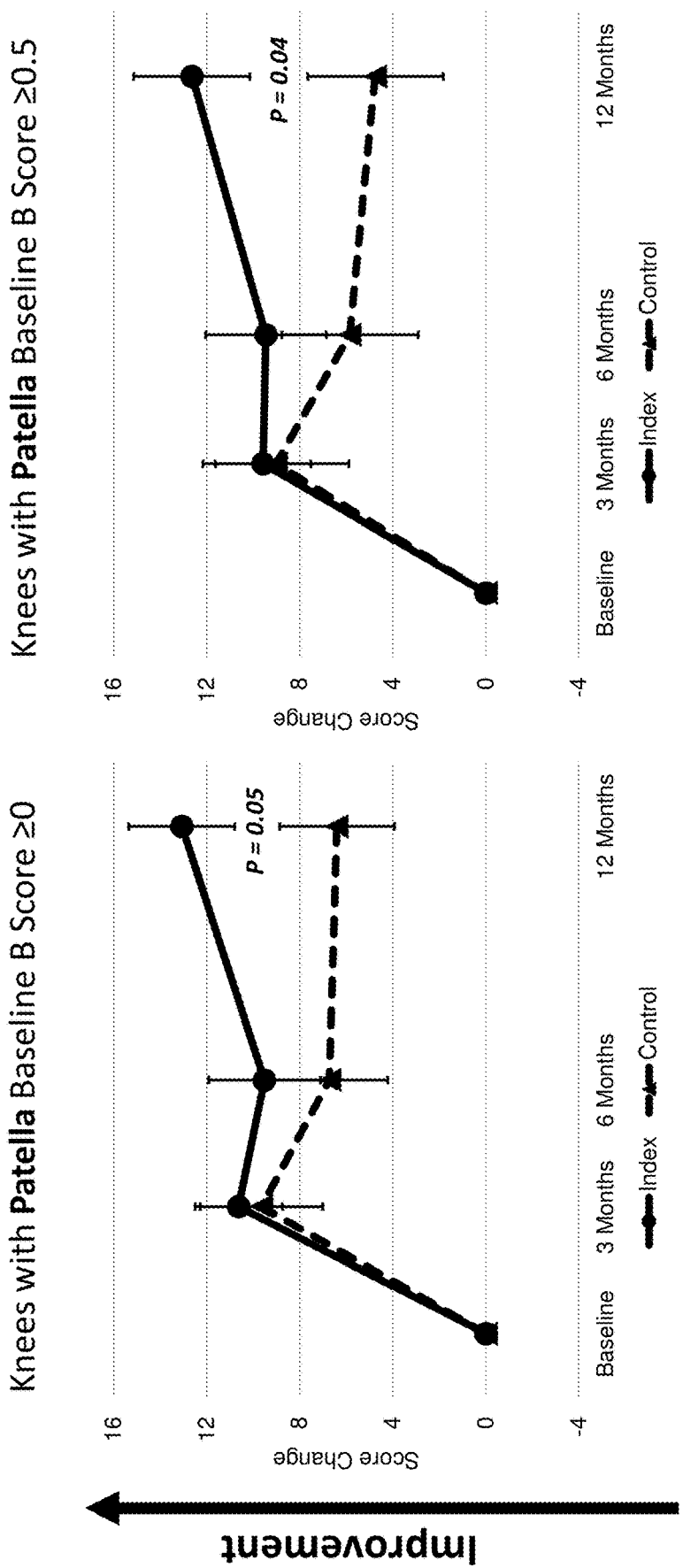
Figure 8: KOOS Pain Improvements in Multiple Patella Baseline B Score Cohorts

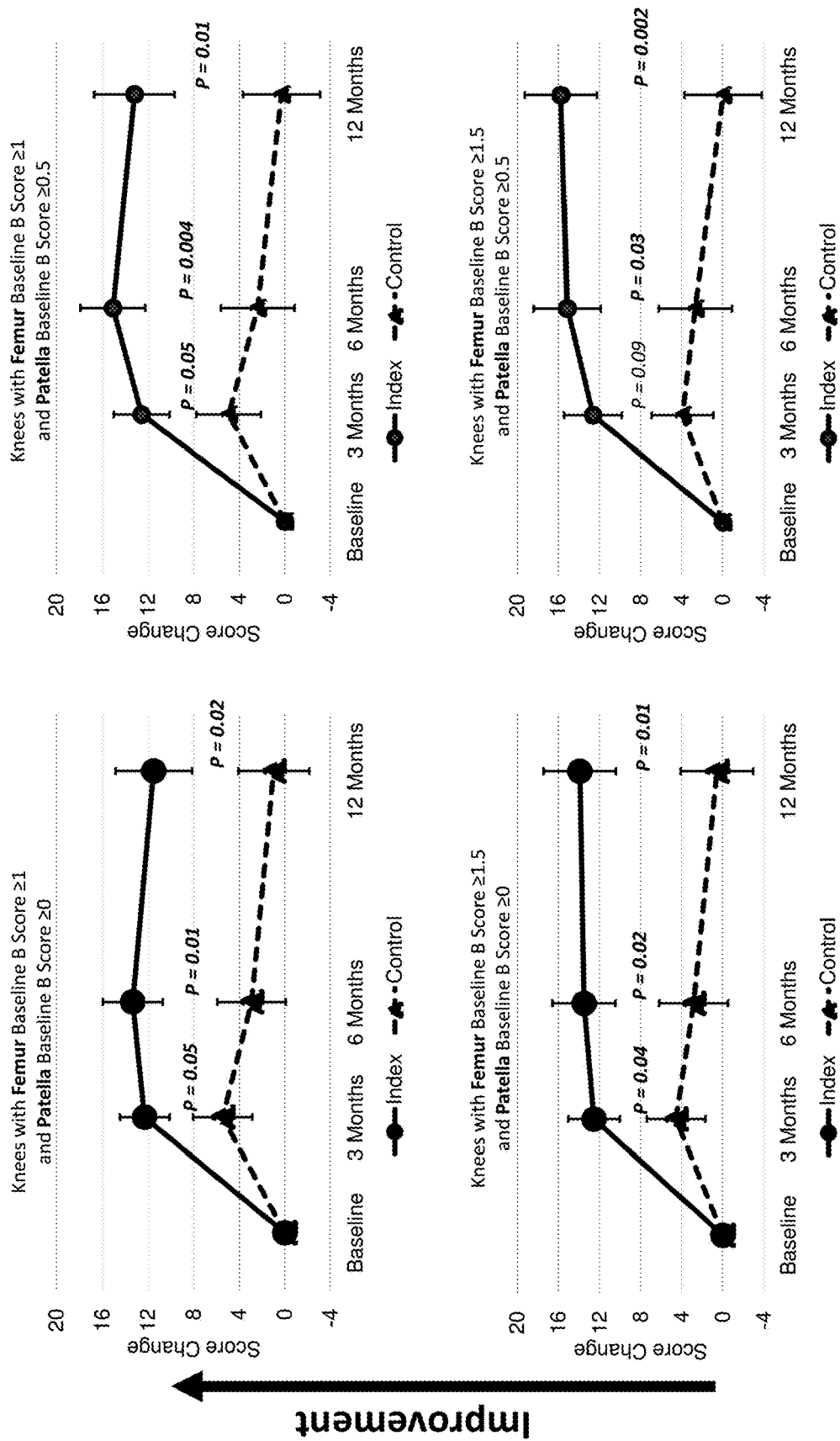
Figure 9: KOOS ADL/WOMAC Function Improvements in the Cohorts with Higher Baseline B Scores in Both Femur and Patella

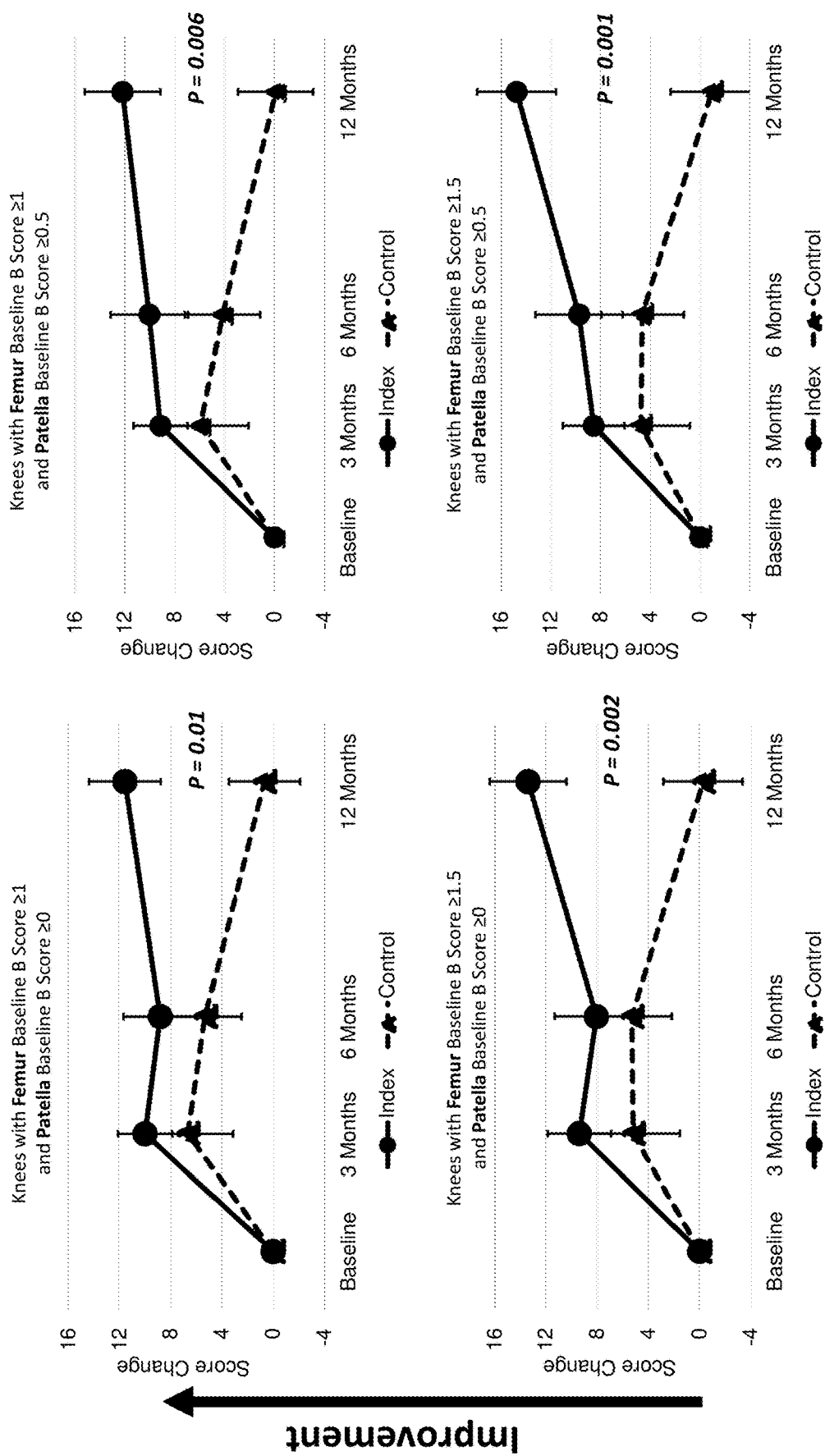
Figure 10: KOOS Pain Improvements in the Cohorts with Higher Baseline B Scores in Both Femur and Patella

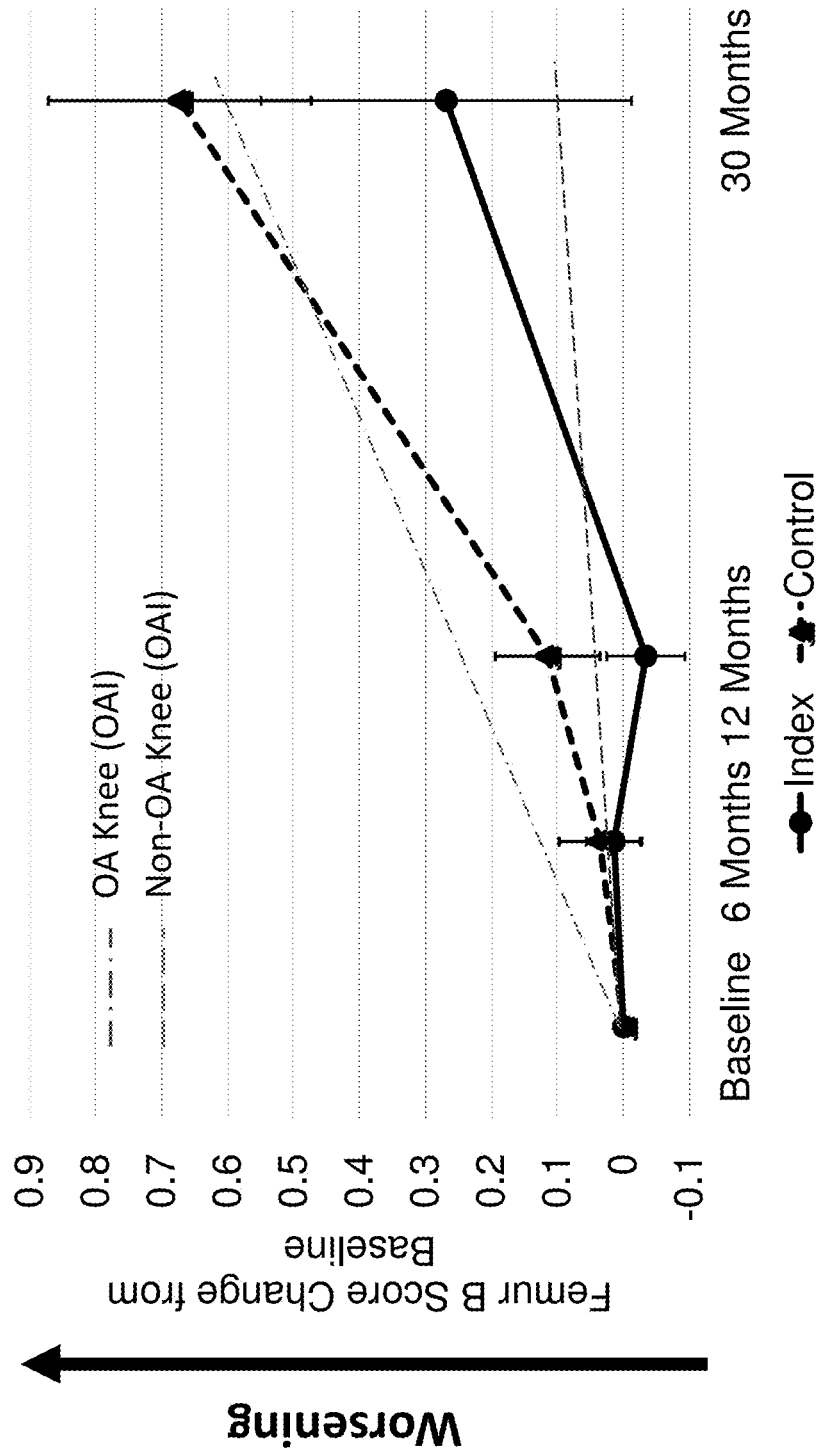
Figure 11: Femur B Score Changes

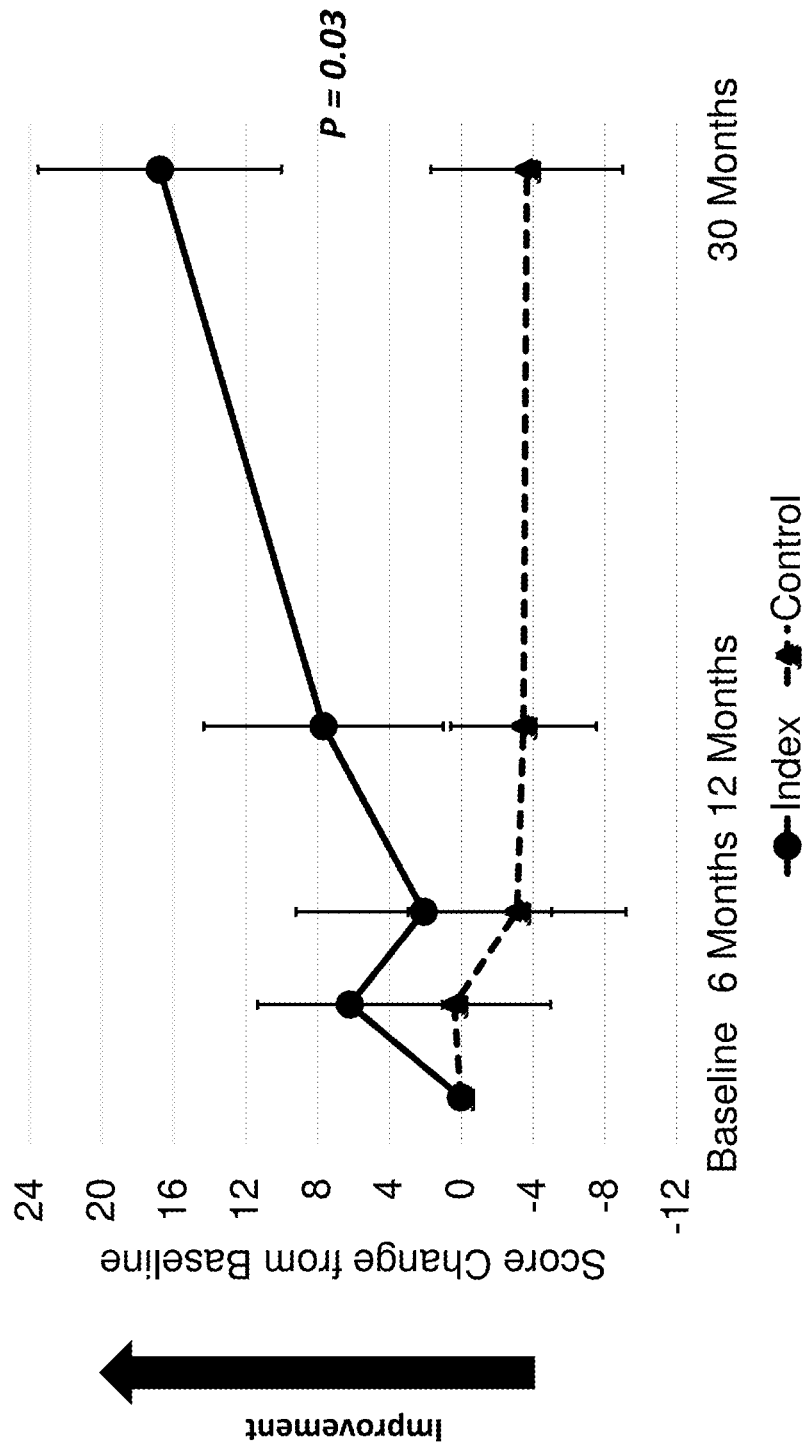
Figure 12: KOOS ADL / WOMAC Function

SEQUENCE LISTING

```
<160> NUMBER OF SEQ ID NOS: 14

<210> SEQ ID NO 1
<211> LENGTH: 20
<212> TYPE: PRT
<213> ORGANISM: Artificial sequence
<220> FEATURE:
<223> OTHER INFORMATION: synthetic sequence
<220> FEATURE:
<221> NAME/KEY: VARIANT
<222> LOCATION: (3)..(4)
<223> OTHER INFORMATION: Xaa is any amino acid
<220> FEATURE:
<221> NAME/KEY: VARIANT
<222> LOCATION: (10)..(11)
<223> OTHER INFORMATION: Xaa is any amino acid
<220> FEATURE:
<221> NAME/KEY: VARIANT
<222> LOCATION: (18)..(19)
<223> OTHER INFORMATION: Xaa is any amino acid

<400> SEQUENCE: 1

Asp Leu Xaa Xaa Arg Gly Asp Asn Asp Xaa Xaa Pro Phe Ser Gly Asp
1               5                   10                  15

Gly Xaa Xaa Phe
            20

<210> SEQ ID NO 2
<211> LENGTH: 20
<212> TYPE: PRT
<213> ORGANISM: Artificial sequence
<220> FEATURE:
<223> OTHER INFORMATION: synthetic sequence
```

<400> SEQUENCE: 2

Asp Leu Gln Glu Arg Gly Asp Asn Asp Ile Ser Pro Phe Ser Gly Asp
1               5                   10                  15

Gly Gln Pro Phe
            20

<210> SEQ ID NO 3
<211> LENGTH: 20
<212> TYPE: PRT
<213> ORGANISM: Artificial sequence
<220> FEATURE:
<223> OTHER INFORMATION: synthetic sequence

<400> SEQUENCE: 3

Asp Leu Gln Glu Arg Gly Asp Asn Asp Met Ser Pro Phe Ser Gly Asp
1               5                   10                  15

Gly Gln Pro Phe
            20

<210> SEQ ID NO 4
<211> LENGTH: 20
<212> TYPE: PRT
<213> ORGANISM: Artificial sequence
<220> FEATURE:
<223> OTHER INFORMATION: synthetic sequence

<400> SEQUENCE: 4

Asp Leu Gln Gly Arg Gly Asp Asn Asp Leu Ser Pro Phe Ser Gly Asp
1               5                   10                  15

Gly Pro Pro Phe
            20

<210> SEQ ID NO 5
<211> LENGTH: 20
<212> TYPE: PRT
<213> ORGANISM: Artificial sequence
<220> FEATURE:
<223> OTHER INFORMATION: synthetic sequence

<400> SEQUENCE: 5

Asp Leu Leu Val Arg Gly Asp Asn Asp Val Pro Pro Phe Ser Gly Asp
1               5                   10                  15

Gly Gln His Phe
            20

<210> SEQ ID NO 6
<211> LENGTH: 22
<212> TYPE: PRT
<213> ORGANISM: Artificial sequence
<220> FEATURE:
<223> OTHER INFORMATION: synthetic sequence
<220> FEATURE:
<221> NAME/KEY: VARIANT
<222> LOCATION: (3)..(4)
<223> OTHER INFORMATION: Xaa is any amino acid
<220> FEATURE:
<221> NAME/KEY: VARIANT
<222> LOCATION: (10)..(11)
<223> OTHER INFORMATION: Xaa is any amino acid
<220> FEATURE:
<221> NAME/KEY: VARIANT
<222> LOCATION: (18)..(19)
<223> OTHER INFORMATION: Xaa is any amino acid

<400> SEQUENCE: 6

Asp Leu Xaa Xaa Arg Gly Asp Asn Asp Xaa Xaa Pro Phe Ser Gly Asp
1               5                   10                  15

Gly Xaa Xaa Phe Lys Asp
            20

<210> SEQ ID NO 7
<211> LENGTH: 22
<212> TYPE: PRT
<213> ORGANISM: Artificial sequence
<220> FEATURE:
<223> OTHER INFORMATION: synthetic sequence

<400> SEQUENCE: 7

Asp Leu Gln Glu Arg Gly Asp Asn Asp Ile Ser Pro Phe Ser Gly Asp
1               5                   10                  15

Gly Gln Pro Phe Lys Asp
            20

<210> SEQ ID NO 8
<211> LENGTH: 22
<212> TYPE: PRT
<213> ORGANISM: Artificial sequence
<220> FEATURE:
<223> OTHER INFORMATION: synthetic sequence

<400> SEQUENCE: 8

Asp Leu Gln Glu Arg Gly Asp Asn Asp Met Ser Pro Phe Ser Gly Asp
1               5                   10                  15

Gly Gln Pro Phe Lys Asp
            20

<210> SEQ ID NO 9
<211> LENGTH: 22
<212> TYPE: PRT
<213> ORGANISM: Artificial sequence
<220> FEATURE:
<223> OTHER INFORMATION: synthetic sequence

<400> SEQUENCE: 9

Asp Leu Gln Gly Arg Gly Asp Asn Asp Leu Ser Pro Phe Ser Gly Asp
1               5                   10                  15

Gly Pro Pro Phe Lys Asp
            20

<210> SEQ ID NO 10
<211> LENGTH: 23
<212> TYPE: PRT
<213> ORGANISM: Artificial sequence
<220> FEATURE:
<223> OTHER INFORMATION: synthetic sequence

<400> SEQUENCE: 10

Thr Asp Leu Gln Glu Arg Gly Asp Asn Asp Ile Ser Pro Phe Ser Gly
1               5                   10                  15

Asp Gly Gln Pro Phe Lys Asp
            20

```
<210> SEQ ID NO 11
<211> LENGTH: 23
<212> TYPE: PRT
<213> ORGANISM: Artificial sequence
<220> FEATURE:
<223> OTHER INFORMATION: synthetic sequence

<400> SEQUENCE: 11

Thr Asp Leu Gln Glu Arg Gly Asp Asn Asp Met Ser Pro Phe Ser Gly
1               5                   10                  15

Asp Gly Gln Pro Phe Lys Asp
            20

<210> SEQ ID NO 12
<211> LENGTH: 23
<212> TYPE: PRT
<213> ORGANISM: Artificial sequence
<220> FEATURE:
<223> OTHER INFORMATION: synthetic sequence

<400> SEQUENCE: 12

Pro Asp Leu Gln Glu Arg Gly Asp Asn Asp Ile Ser Pro Phe Ser Gly
1               5                   10                  15

Asp Gly Gln Pro Phe Lys Asp
            20

<210> SEQ ID NO 13
<211> LENGTH: 23
<212> TYPE: PRT
<213> ORGANISM: Artificial sequence
<220> FEATURE:
<223> OTHER INFORMATION: synthetic sequence

<400> SEQUENCE: 13

Pro Asp Leu Gln Gly Arg Gly Asp Asn Asp Leu Ser Pro Phe Ser Gly
1               5                   10                  15

Asp Gly Pro Pro Phe Lys Asp
            20

<210> SEQ ID NO 14
<211> LENGTH: 23
<212> TYPE: PRT
<213> ORGANISM: Artificial sequence
<220> FEATURE:
<223> OTHER INFORMATION: synthetic sequence

<400> SEQUENCE: 14

Pro Asp Leu Leu Val Arg Gly Asp Asn Asp Val Pro Pro Phe Ser Gly
1               5                   10                  15

Asp Gly Gln His Phe Met His
            20
```

METHOD TO IDENTIFY RESPONDERS TO OSTEOARTHRITIS THERAPEUTICS

FIELD OF THE INVENTION

The invention related to the field of diagnostic and methods of treatment particularly with osteoarthritis patients who are responsive to a therapeutic intervention with clinical benefits, including those measured by patient-reported outcomes such as improved joint function and decreased pain.

BACKGROUND

Osteoarthritis

Osteoarthritis (OA) is the most common disease of the joints and one of the most widespread of all chronic diseases. In the US, this debilitating condition is second only to heart disease as a cause of work disability in men over 50 years of age. Globally, osteoarthritis is the 6th leading cause of years living with disability (Woolf 2003).

Pain is a common symptom in patients with knee OA. Pain typically is treated with non-steroidal anti-inflammatory drugs (NSAIDs). However, further to the initial Boxed Warning and Warnings and Precautions sections of the prescription labels of NSAIDs in 2005, the United States Food and Drug Administration (FDA) in 2015 strengthened the existing label warning that non-aspirin NSAIDs, including over-the-counter products, increase the chance of a heart attack or stroke (FDA Drug Safety Communication: FDA strengthens warning that non-aspirin nonsteroidal anti-inflammatory drugs (NSAIDs) can cause heart attacks or strokes: Jul. 9, 2015).

Intra-articular treatments using corticosteroids or hyaluronic acid products are also used to reduce pain in knee OA. Corticosteroid injections have been implicated in further cartilage degeneration in the knees (McAlindon 2017), making many clinicians reluctant to use this treatment modality. Corticosteroid injections are not recommended by The American Academy of Orthopaedic Surgeons or The American Association of Orthopaedic Surgeons for treatment of knee OA (Recommendation 8 in AAOS Treatment of Osteoarthritis of the Knee—$2^{nd}$ Edition, Evidence-Based Clinical Practice Guideline: Adopted by American Academy of Orthopaedic Surgeons Board of Directors, May 18, 2013).

While hyaluronic acid or "viscosupplementation" products may reduce joint pain for weeks to months in some patients (Cohen 1998), multiple clinical trials have failed to demonstrate a clinically meaningful treatment effect. The American Academy of Orthopaedic Surgeons and American Association of Orthopaedic Surgeons state "We cannot recommend using hyaluronic acid for patients with symptomatic osteoarthritis of the knee." (Recommendation 9 in AAOS Treatment of Osteoarthritis of the Knee—$2^{nd}$ Edition, Evidence-Based Clinical Practice Guideline: Adopted by American Academy of Orthopaedic Surgeons Board of Directors, May 18, 2013).

Surgical therapies are also being employed to treat OA.

Microfracture and abrasion of the bone under the knee cartilage is used to induce formation of fibrocartilage (scar cartilage). However, with microfracture technique, the normal hyaline cartilage structure cannot be restored, and resulting fibrocartilage is less mechanically stable as compared to the normal cartilage (Erggelet 2016).

Osteochondral autograft/allograft transplantation, or OATS procedure, requires two surgeries and treatment failures are common. Additional surgery is sometimes required to manage complications. In addition, patients cannot weight-bear for approximately six weeks after the OATS procedure, making recovery arduous for some.

Autologous chondrocyte implantation (ACI) of products such as Carticel® also requires two surgeries. In the study of more than 150 patients, 49% of patients required repeat surgery for complications (Zaslav 2009). Common complications include delamination, graft failure and disturbed graft fusion (Niemeyer 2008).

When knee joint deterioration is severe, joint replacement surgery may be the only option. Total knee replacement (TKR) is an invasive and expensive procedure with potentially serious morbidity. Total knee replacement (TKR) costs $35,000-70,000 per knee. This does not include costs of post-operative rehabilitation (at least six weeks) and lost productivity. Prosthetic joints have a limited life expectancy and typically must be replaced after 15-20 years; hence TKR may be reserved for older patients. Nevertheless, the average age of the patients who receive TKR has been falling. While the average age in 2000 in the U.S. was 68 years old, it declined to 65.9 years in 2014 (American Academy of Orthopaedic Surgeons 2018). Over 680,000 TKR surgeries were performed in 2014, and approximately 1.28 million TKR surgeries (excluding revision surgeries) will be performed in the U.S. in 2030, per estimates of The American Academy of Orthopaedic Surgeons (American Academy of Orthopaedic Surgeons Research News Mar. 6, 2018).

Osteoarthritis Therapeutics Targeting Cartilage

Enormous efforts have been made to develop OA treatments that slow knee joint degeneration by promoting formation of articular cartilage or by inhibiting cartilage degradation. This approach to disease modification has been based on the hypothesis that articular cartilage degeneration is the primary pathologic mechanism driving knee OA.

Several groups have attempted to develop inhibitors of matrix metalloproteinases (MMPs), which are hypothesized to have a role in cartilage degradation (Krzeski 2007). Others have attempted to inhibit endogenous nitric oxide, which is believed to accelerate cartilage destruction (Hellio le Graverand 2013). Numerous drugs believed to inhibit cartilage degeneration in knee OA have been tested in controlled clinical trials; however, thus far none has demonstrated the efficacy and safety required for regulatory approval.

Growth factors also have been tested for efficacy in cartilage regeneration. Fibroblast Growth Factor-18 (FGF-18, a.k.a., Sprifermin) was associated with a small but statistically significant increase in tibiofemoral cartilage thickness in subjects with knee OA; however, FGF-18-treated subjects had no significant improvement in clinical outcomes such as knee function or pain when compared with placebo-exposed subjects (Hochberg 2017, Hochberg 2018).

Emphasis on Patient Benefits in New Regulatory Guidance for OA Therapies

The FDA has noted the lack of concordance between structural (cartilage) thickness increase, as measured by MRI or x-ray imaging, and clinical benefits in patients with knee OA. Noting the observed discordance between structural cartilage measures and clinical outcomes, the FDA replaced previous (1999) draft guidance for development of disease-modifying OA drugs (DMOADs) in August 2018.

In the 1999 draft guidance, an increase in joint space width or a delay in narrowing of the joint space as measured by X-ray represented a potentially acceptable endpoint for drug approval.

In the new draft guidance, the FDA offered no specific structural outcome measures or modalities that might be acceptable for DMOAD approval; rather, the Agency emphasized that a treatment must demonstrate meaningful patient benefits, such as improvement of knee pain and/or function, or avoidance or delay in the need for joint replacement surgery, in order to be considered for approval as a DMOAD. Improvements in structural outcomes should be concordant with clinical benefits (Osteoarthritis: Structural Endpoints for Development of Drugs, Devices, and Biological Products for Treatment. Guidance for Industry. FDA 2018).

Three-Dimensional (3D) Subchondral Bone Shape, a New Structural Marker for Knee OA Pathological changes in the bones underlying and supporting knee cartilage have been shown to predict the onset and progression of knee OA and are measurable on MRI even before cartilage loss (Reichenbach 2008). Bone shape in the knee joint can be measured precisely and objectively in three dimensions using MRI-based images (Bowes 2013, Hunter 2016).

Data from the Osteoarthritis Initiative (OAI), a prospective, observational study of more than 4,700 subjects (more than 9,000 knees) with and without knee OA who were followed for four years or longer demonstrated that the 3D shapes of bones comprising the knee joint change over time. In osteoarthritic knees, the rate of change of 3D bone shape is markedly increased compared to that in non-osteoarthritic knees (Bowes 2019).

Data from the OAI indicate that a flattening of bone shape occurs in the femur, tibia and patella over time, even prior to measurable cartilage loss (Bowes 2013). In subjects with knee OA, radiographically defined as a Kellgren-Lawrence (KL) grades of 2 or greater on X-ray, the rate of bone-shape change is significantly faster than that in subjects without OA (KL grade of 0) (Bowes 2019).

As a structural marker, 3D bone shape change predicts radiographic (X-ray) onset of knee OA (Neogi 2013) and is more sensitive to change over time than X-ray (Hunter 2016). The magnitude of 3D bone shape change over the course of four years predicts the likelihood of joint failure as indicated by TKR (Barr 2016), and predicts progression of knee pain better than does semi-quantitative analysis of bone marrow lesions (Dube 2018).

In each of the studies cited, the femur had greater sensitivity to change than did the tibia or patella. The femoral bone shape metric, or "B-score", is a form of statistical z-score that represents where the bone shape lies along a vector from the origin, representing the bone shape of normal (non-osteoarthritic) knees (0) towards the bone shape of osteoarthritic knees (>0, positive direction). Knees used to define the 3D shape vector were categorized using centrally-read and adjudicated Kellgren-Lawrence (KL) grading of X-rays that were obtained as part of the Osteoarthritis Initiative (OAI) (Bowes 2019, Bowes 2020).

The 3D shape change of femur, tibia, and patella bone surfaces can be automatically segmented from MRI images using active appearance models (AAMs) (Williams 2010).

The flattening of the femur, tibia or patella is a component of 3D bone shape change in the knees, which expands the subchondral bone area.

In a nested case-control study from the OAI, changes in bone area and bone shape at 24 months from baseline were measured in subjects with knee OA who were taking bisphosphonates for osteoporosis and in OA-matched non-bisphosphonate users. Subjects in the bisphosphonate group had a statistically significant reduction in bone area expansion in the medial tibia compared with controls (Haj-Mirzaian 2018).

Therapeutic agents such as bisphosphonates used to treat osteoporosis have been investigated in prospective clinical trials in subjects with knee OA.

These include risedronate (Bingham 2006), zolendronate (Laslett 2012), strontium ranelate (Reginster 2013), and calcitonin (Karsdal 2015). Effects on pain have been mixed, with results of the largest study (risedronate; n=2483) favoring placebo over active drug (Bingham 2006). In addition, the potential for serious adverse effects has dampened enthusiasm for these agents. For example, strontium ranelate was found to increase the risk of myocardial infarction and its use has been limited by the European Medicines Agency. None of these drugs has been shown to have a significant effect on the structural progression of OA as measured by X-ray or 3D bone shape analysis.

A Therapeutic that Impacts Pathological 3D Bone Shape Change

To date, the only therapeutic agent that has been shown to significantly reduce pathological 3D bone shape change is the peptide of amino acid sequence TDLQERGDNDIS-PFSGDGQPFKD (SEQ ID No: 10) (McGuire 2019, McGuire 2020).

Importantly, in addition to bone shape stabilization in the joint, the peptide of SEQ ID No: 10 has demonstrated clinically meaningful and statistically significant improvements in standardized, validated outcome measures of critical knee functions, sports and recreation activities, knee-related QOL, knee pain frequency, knee pain going up or down stairs, and in the most widely used knee OA outcome measure, the WOMAC total score (McGuire 2017, McGuire 2018).

These observations are remarkable in showing, for the first time, that pathological 3D bone shape change in the knees can be slowed, arrested, or possibly reversed by a drug therapy, and that slowing or arresting pathological 3D bone shape change is linked to significant clinical benefits across a broad range of subjects, including many with severe tibiofemoral knee OA (McGuire 2019).

Another notable result was the significant correlation between reduced 3D bone shape change and increased thickness or stabilization of tibiofemoral cartilage (McGuire 2020). The reduction in rate of pathological bone shape change by the peptide of SEQ ID No: 10 may have stabilized the overlying cartilage by providing better mechanical and trophic support.

These clinical data across a range of patients with mild to severe knee OA demonstrated that modifying pathological 3D shape change of subchondral bones is feasible by a therapeutic intervention and that such structural activity on subchondral bone is associated with clinically meaningful and statistically significant improvements in joint function, pain reduction, and other patient-reported benefits. These clinical outcomes led to an invention of a novel treatment method of OA and other joint diseases and disorders, as well as the therapeutic compounds and formulation therefor (US Patent Publications: US-2020-0129588-A1 and US-2020-0170939-A1, PCT Patent Publication: WO 2020/117360).

The peptide of SEQ ID No: 10 was derived from human Matrix Extracellular Phosphoglycoprotein, or MEPE, and is known to selectively acts on cells committed to hard tissue lineages, i.e., bone, cartilage, and dentin.

Orthologues of the peptide of SEQ ID No: 10 have been identified in chimpanzee, macaque, cow, dog, rat, and mouse and all of them share a consensus amino acid sequence of DLXXRGDNDXXPFSGDGXXF (SEQ ID No: 1), wherein X is any amino acid.

It is known that the least homologous orthologues, human and rat, demonstrate the same biological activities on human and rat bone cells interchangeably (Nagel 2004). The human orthologue has exhibited activities on bone, cartilage, and dentin in mouse, rat, dog, goat, and baboon (Hayashibara 2004, Lazarov 2004, Rosen 2006, Six 2007, Middleton-Hardie 2010, U.S. Pat. Nos. 7,888,462 and 8,426,558). It is therefore believed that the peptides sharing the consensus amino acid sequence of SEQ ID No: 1 share the biological activities in hard tissues. These peptides have been administered in in vivo studies systemically or locally by conventional methods via intravenous, subcutaneous, intra-cutaneous, intra-articular or other routes.

Osteoarthritis and Patient-Reported Outcomes

As described above, the FDA in its latest draft guidance emphasizes that an OA therapy must demonstrate meaningful patient benefits, such as improvement of pain and/or function. This regulatory position clearly has made clinical assessment of pain and/or function most important in OA drug approval.

In OA, these patient benefits are measured by patient-reported outcome (PRO) measures. The most widely accepted and used PROs for OA are the WOMAC (Western Ontario and McMaster Universities Osteoarthritis Index), KOOS (Knee injury and Osteoarthritis Outcome Score), HOOS (Hip disability and Osteoarthritis Outcome Score), NRS (Numerical Rating Scale), and VAS (Visual Analogue Scale) measurement tools.

Clinical assessment using PROs is often challenging in that it relies on the patients' subjective feelings and sensations.

For example, a pain measure often asks patients to rate their pain intensity with alternative terms such as "none", "mild", "moderate", "severe", or "extreme". WOMAC, KOOS, and HOOS all use these terms. Because pain sensitivity may vary among individuals, the difference between "mild" vs. "moderate", "moderate" vs. "severe", or "severe" and "extreme" may vary among patients.

If a numerical scale such as NRS or VAS is used, a 5 (out of 10) in pain intensity in one patient could be expressed as a 7 in intensity by another, due to pain sensitivity or other factors.

This makes precise assessment of pain experienced by the patient extremely challenging and can result in inaccurate diagnosis and treatment, and, in some cases, may contribute to patient's dissatisfaction with caregivers and the medical system.

A more precise assessment or prediction of patients' symptoms would allow caregivers to make a better treatment decisions and improve patient outcomes.

Patient-Reported Outcomes and Placebo Effect

When therapeutic efficacy is measured by a PRO, the results may be confounded even when the tested therapy is effective.

A common issue that confounds testing of treatment effects result is placebo response. Placebo response is attributed to numerous factors, including individual patient's sensitivity to suggestion, confidence in care, previous treatment success or failure, and clinical setting—patient interactions (Wager 2015). Even if a placebo treatment is pharmacologically inert, the psychological influence from the fact of "being treated" may generate a belief that treatment works, resulting in placebo effects.

In case of OA clinical trials, intra-articular (IA) injection of saline has been used as a placebo. However, saline is not pharmacologically inert, and can demonstrate efficacy on pain, function, and symptoms presumably because of dilution and clearance of inflammatory mediators in the synovial space (Saltzman 2016).

Whereas placebo effect is hard to eliminate, attempts have been made to minimize its impact.

An example is a randomized withdrawal design clinical study. In this study design, all enrolled subjects receive active therapy for a certain period. After the initial active treatment period, a group randomly assigned to placebo are switched to placebo treatment without knowledge, while the active treatment group stays on the assigned drug. Individuals in the placebo group typically report waning of improvement in outcomes over time, while treatment outcomes in the active group remain positive or further improve, if treatment is, in fact, effective. This method may reduce study failures of effective treatments, although it typically extends the required study period and may increase study costs (Nair 2019).

Another example of challenges in testing of treatments using patient-reported outcome measures is enrolling trial subjects who may, consciously or unconsciously, inflate subjective symptom scores because they believe this may increase their chances of being selected for the study. As the study progresses, patients on placebo who have inflated their symptom scores at baseline may report reduced symptom scores that actually reflect their "true" (non-inflated) baseline. This can confound the measurement of a drug-treatment effect, if one is present (Katz 2020).

There is a need to minimize the impact of placebo effect associated with PROs, which would make clinical studies more efficient and cost-effective.

SUMMARY OF THE INVENTION

The invention includes a method, comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising a peptide having an amino acid sequence of TDLQERGDNDISPFSGDGQPFKD (SEQ ID No: 10) and/or any of the peptides disclosed here alone or in combination.

The invention includes a use of a peptide in treating bone, the use comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising the peptide having an amino acid sequence of TDLQERGDNDISPFSGDGQPFKD (SEQ ID No: 10) and/or any of the peptides disclosed here alone or in combination.

The invention includes a formulation comprising a peptide having an amino acid sequence of TDLQERGDNDISPFSGDGQPFKD (SEQ ID No: 10) wherein the formulation is for use in a method, comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising the peptide having an amino acid sequence of TDLQERGDNDISPFSGDGQPFKD (SEQ ID No: 10

A method to identify an osteoarthritic joint that is more responsive to a therapeutic intervention is presented.

The therapeutic intervention can be any type of therapeutic drug, device, or procedures but preferably the one that impacts subchondral bone of the joint.

It would be more preferable if the therapy modifies the structure of the subchondral bone, in particular, three-dimensional (3D) shape of the subchondral bone.

The response to said therapeutic interventions includes an improvement in one or more of patient-reported clinical benefits in a joint such as function, pain, stiffness, other symptoms and conditions including total condition of the joint.

The joint is preferably a knee joint but other joints such as hip, hand, finger, ankle, shoulder, elbow, spine, and temporomandibular joint are also within the scope.

This method is useful in identifying an OA joint that is likely to show more robust and/or faster patient-reported clinical benefits in response to a treatment that is known or supposed to be effective in providing clinical benefits.

It is useful in clinical practice where a caregiver makes a treatment decision.

It is also useful when used as an enrollment criterion in a clinical study to select a more treatment-responsive patient cohort.

Depending upon the type of therapy tested in a clinical study, this method may be useful in reducing placebo effect.

This method may be useful for joints affected by other conditions such as joint trauma and rheumatoid arthritis.

The method comprises measuring 3D shape of the subchondral bones in a joint, determining whether the pathological 3D shape change of the bone is above or below a certain severity threshold, and deciding whether or not the joint is suitable to the intended treatment.

The 3D shape of subchondral bone can be measured using any joint imaging methodologies including MRI, ultrasound, and computer tomography.

The obtained image can be analyzed using a statistical shape modeling algorithm; in particular, active appearance model (AAM).

When treatment target is a knee joint, the method comprises measuring B-score(s) of femur and/or patella before starting treatment ("Baseline B-Score") and determining whether the Baseline B-Score is above or below a certain pre-determined threshold depending on the intended treatment.

The threshold can be modified depending on the strength and/or mode of action of the therapy to be used.

One of the preferred therapeutic interventions in this invention is intra-articular (IA) administration of a group of peptides having a consensus amino acid sequence of SEQ ID No: 1.

The best preference among this group is the peptide of SEQ ID No: 10.

If the intended therapy is with the peptide of SEQ ID No: 10, and treatment target is an OA knee, the knee with Baseline B-Score ≥0 in the femur would respond to one series of treatment (four times IA injections on days 0, 7, 14, and 21) of the peptide and demonstrate clinically meaningful improvements in knee function and/or pain within 12 months of the treatment.

A knee with a femur Baseline B-Score ≥0.5 shows greater improvements.

A knee with a femur Baseline B-Score ≥1.0 shows further improvements.

A knee with a femur Baseline B-Score ≥1.5 shows the best improvement.

If the patella Baseline B-Score is used, a knee with patella Baseline B-Score ≥0 demonstrates clinically meaningful improvements in knee function and/or pain in response to the same treatment within 12 months of the treatment.

A knee with a patella Baseline B-Score ≥0.5 shows the greatest improvement.

Baseline B-Scores of femur and patella can be used together for the predictive assessment. If the femur Baseline B-Score is ≥1.0 in a knee, for example, treatment response to the peptide of SEQ ID No: 10 would be better and faster when the knee also has a patella Baseline B-Score ≥0.

A patella Baseline B-Score ≥0.5 in combination with a femur baseline B-Score ≥1.0 improves the results more.

In all of these scenarios, clinically meaningful knee function and pain improvements are expected within 12 months after a single series of treatment.

In general, the higher the femur and/or patella Baseline B-Score, the greater and/or faster are the improvements in knee function, pain, and/or other clinical benefits expected by treatment with the peptide of SEQ ID No: 10 or a pharmaceutical composition comprising thereof.

This method can be applied to other therapies that can modify the structure of subchondral bones in a knee or other joints, thereby improving patient-reported clinical benefits.

This method is also useful in other therapies with different modes of action, including analgesic and/or anti-inflammatory agents.

Another embodiment of this invention is a method of treatment of knee OA.

The method comprises measuring B-score of a femur and/or patella of an OA knee and determine the dose and treatment frequency of a therapeutic agent that is expected to show clinical benefits.

This method of treatment is particularly useful for an OA therapy that modifies pathological 3D shape change of subchondral bones in the knee, such as a peptide of SEQ ID No: 10.

In an aspect of the invention, the dosing may be in a range of from 50 mg to 500 mg, or 100 mg to 400 mg, or 200 mg, wherein all milligram doses are ±20%, ±10%, ±5%.

This method is also useful when treating a traumatic knee.

This method is also useful in designing a clinical study of knee OA.

Depending on the targeted treatment regimen of an OA therapy to be tested, a patient population with specific B-score threshold can be selected for enrollment to its clinical study.

BRIEF DESCRIPTION OF THE DRAWINGS

The invention is best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 1 contains three histograms comparing distributions of baseline femur B-score of 5,378 OA knees in the OAI database, 78 OA knees assigned to treatment with peptide of SEQ ID No: 10 (Index knees), and 78 OA knees assigned to treatment with placebo (Control knees) in the clinical study. The distributions of B-scores were very similar among the three groups of knees. The mean femur Baseline B-Scores of the groups were nearly identical, which were 1.52, 1.48, and 1.48, respectively.

FIG. 2 is a graph showing the result of a clinical study indicating changes in the mean femur B-score from baseline in mild to severe knee OA patients. Index and Control knees in 78 subjects were compared though 12 months. Paired Student's t-test indicated significant reductions of pathological B-score changes in Index knees as compared to Control knees at 6 and 12 months.

FIG. 3 is a graph showing data from a clinical study demonstrating changes in KOOS ADL (Knee injury and Osteoarthritis Outcome Score—Activities of Daily Living) score from baseline in mild to severe knee OA patients. Index and Control knees in 78 subjects were compared. Paired Student's t-test showed statistically significant knee function improvement in Index knees as compared to Control knees at 6 and 12 months. Since KOOS ADL shares the same questionnaire with WOMAC (Western Ontario and McMaster Universities Osteoarthritis Index) Function subscale, the results in WOMAC Physical Function are the same.

FIG. 4 is a set of graphs showing the results of a clinical study comparing changes in B-scores in four femur Baseline B-Score cohorts; ≥0, ≥0.5, ≥1.0, and ≥1.5. In each graph, Index and Control knees in the respective femur Baseline B-Score cohorts were compared with regard to their femur B score changes at 6 and 12 months after treatment. The numbers of Index and Control knees in each cohort are shown in Table 1. Unpaired unequal variance Student's t-test indicated a statistical trend or significant reduction of B-score changes in Index knees as compared to Control knees at 6 months, with differences between Index and Control knees at 6 months in favor of drug treatment increasing in the higher femur Baseline B-Score cohorts. Notably, in all cohorts, the trajectory of the B-score change in Index knees for the first 6 months after treatment was similar to that of non-OA knees in the OAI database.

FIG. 5 is a set of graphs showing the results of a clinical study comparing knee function changes in four femur Baseline B-Score cohorts; ≥0, ≥0.5, ≥1.0, and ≥1.5. In each graph, Index and Control knees in the respective femur Baseline B-Score cohorts were compared for their KOOS ADL score changes at 3, 6, and 12 months after treatment. The numbers of Index and Control knees in each cohort are shown in Table 1. Unpaired unequal variance Student's t-test indicated a statistical trend or significant improvement in KOOS ADL scores in Index knees as compared to Control knees at 3, 6, and 12 months in higher Baseline B-Score cohorts. The differences between Index and Control knees in favor of drug treatment at all time points increased in the higher femur Baseline B-Score cohorts.

FIG. 6 is a set of graphs showing data obtained in a clinical study comparing knee pain changes in four femur Baseline B-Score cohorts; ≥0, ≥0.5, ≥1.0, and ≥1.5. In each graph, Index and Control knees in the respective femur Baseline B-Score cohorts were compared for KOOS Pain score changes at 3, 6, and 12 months after treatment. The numbers of Index and Control knees in each cohort are shown in Table 1. Unpaired unequal variance Student's t-test indicated statistically significant improvements of KOOS Pain scores in Index knees as compared to Control knees at 12 months in the two higher Baseline B-Score cohorts. The differences between Index and Control knees in favor of drug treatment at 12 months increased in the higher femur Baseline B-Score cohorts.

FIG. 7 is a set of graphs showing the results from a clinical study comparing knee function changes in two patella Baseline B-Score cohorts; ≥0 and ≥0.5. In each graph, Index and Control knees in the respective patella Baseline B-Score cohorts were compared for their KOOS ADL score changes at 3, 6, and 12 months after the treatment. The numbers of Index and Control knees in each cohort are shown in Table 4. Unpaired unequal variance Student's t-test indicated statistically significant improvements of KOOS ADL scores in Index knees as compared to Control knees at 6 and 12 months in both cohorts. The difference between Index and Control knees at 12 months in favor of drug treatment increased in the higher patella Baseline B-Score cohorts.

FIG. 8 is a set of graphs showing data from a clinical study comparing knee pain changes in two patella Baseline B-Score cohorts; ≥0 and ≥0.5. In each graph, Index and Control knees in the respective patella Baseline B-Score cohorts were compared for their KOOS Pain score changes at 3, 6, and 12 months after the treatment. The numbers of Index and Control knees in each cohort are shown in Table 4. Unpaired unequal variance Student's t-test indicated statistically significant improvements of KOOS Pain scores in Index knees as compared to Control knees at 12 months in both cohorts. The difference between Index and Control knees at 12 months in favor of drug treatment increased in the higher patella Baseline B-Score cohorts.

FIG. 9 is a set of graphs showing the results from a clinical study comparing knee function changes in four combined femur and patella Baseline B-Score cohorts; ≥1.0 and ≥0, ≥1.0 and ≥0.5, ≥1.5 and ≥0, and ≥1.5 and ≥0.5, respectively. In each graph, Index and Control knees in the respective femur/patella Baseline B-Score cohorts were compared for their KOOS ADL score changes at 3, 6, and 12 months after treatment. The numbers of Index and Control knees in each cohort are shown in Table 7. Unpaired unequal variance Student's t-test indicated statistical trend or significant improvements of KOOS ADL scores in Index knees as compared to Control knees at all time points in all cohorts. The difference between Index and Control knees in favor of drug treatment increased at all time points in the higher femur/patella Baseline B-Score cohorts.

FIG. 10 is a set of graphs showing data from a clinical study comparing knee pain changes in four combined femur and patella Baseline B-Score cohorts of ≥1.0 and ≥0, ≥1.0 and ≥0.5, ≥1.5 and ≥0, and ≥1.5 and ≥0.5, respectively. In each graph, Index and Control knees in the respective femur/patella Baseline B-Score cohorts were compared for their KOOS Pain score changes at 3, 6, and 12 months after the treatment. The numbers of Index and Control knees in each cohort are shown in Table 7. Unpaired unequal variance Student's t-test indicated statistically significant improvements of KOOS Pain scores in Index knees as compared to Control knees at 12 months in all cohorts. The difference between Index and Control knees at 12 months increased in favor of drug treatment in the higher femur/patella Baseline B-Score cohorts.

FIG. 11 is a graph showing the result of a clinical study comparing femur B-score changes in Index and Control knees that belonged to the Baseline B-Score <0 cohort. No statistical difference was detected between Index and Control knees at any time point. The trajectory of the B-score change in Index knees at 30 months was closer to that of the non-OA knees from the OAI database. In contrast, the trajectory of B-score change in Control knees was closer to that of the OA knees from the OAI database.

FIG. 12 is a graph demonstrating a result obtained from a clinical study comparing KOOS ADL score changes in Index and Control knees that belonged to the Baseline B-Score <0 cohort. Unpaired unequal variance Student's t-test indicated statistically significant improvements of KOOS ADL scores in Index knees as compared to Control knees at 30 months.

In FIGS. 2 through 12, the treatments were IA injections of either the peptide of SEQ ID No: 10 in Index knees or an identical volume of saline placebo in Control knees, administered on days 0, 7, 14, and 21. The error bars in the graphs indicate the standard error of the mean.

DETAILED DESCRIPTION OF THE INVENTION

Before the present methods, uses and formulations are described, it is to be understood that this invention is not limited to particular embodiments described, and as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "an injection" includes a plurality of such injections and reference to "the measurement" includes reference to one or more measurements and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Three-Dimensional Bone Shape Change and B-Score

As described in the Background section, three-dimensional (3D) shape of the bones, in particular subchondral bones in a joint, show uni-directional change with aging. The rate of change is pathologically advanced and/or accelerated in osteoarthritis (OA), as demonstrated by prospective observational studies with a large database sponsored by the National Institutes of Health, specifically, the Osteoarthritis Initiative (OAI), which includes more than 4,700 subjects (more than 9,000 knees) with and without knee OA who have been followed clinically and radiographically for four to eight years.

In the OAI-based studies, the 3D bone shape change of subchondral bones in the knee joint was demonstrated to effectively distinguish people with OA from those without OA, and reliably predicts onset, progression, clinical symptoms, and outcomes, including knee joint failure.

The femoral bone shape metric, "B-score", was developed as a form of statistical z-score that represents where the bone shape lies along a vector from the origin, the bone shape of normal (non-osteoarthritic) knees (0) towards the bone shape of osteoarthritic knees (>0, positive direction). Knees that were used to define the 3D shape vector were categorized using centrally read and adjudicated Kellgren-Lawrence (KL) grading of X-rays that were obtained as part of the Osteoarthritis Initiative (OAI) (Bowes 2019, Bowes 2020).

Although "B-score" was originally used as a shape metric of femur, the same scoring system can be made and used for tibia and patella, respectively. In the clinical studies described in this specification, we measured B-scores for femur, tibia, and patella, respectively, and those data supported the present invention.

A randomized, double-blind, placebo-controlled clinical trial in subjects with knee OA demonstrated that the peptide of SEQ ID No: 10 slowed or arrested pathological 3D bone shape change in the treated OA knee joint compared with the placebo-exposed Control knees Importantly, the reduced pathological 3D bone shape change in treated knees also was associated with robust and significant improvements in OA clinical signs and symptoms such as physical function, pain frequency, and multiple other clinical parameters in the knee joint.

Clear associations or statistically significant correlations were observed between reduction in pathological 3D knee joint bone shape changes and clinical benefits.

Effects of the Peptide of SEQ ID No: 10 on Bone Structure and Clinical Benefits in OA Knees EXAMPLE 1 describes the details of a clinical trial, which tested safety and efficacy of the peptide of SEQ ID No: 10 in mild to severe knee OA. In this study, distributions of femur B-scores in the active drug treated Index knees (N=78) and placebo exposed Control knees (N=78), as well as the OA knees in the OAI database (N=5,378) were very similar See FIG. 1. Their mean B-scores at the baseline were almost identical: 1.48, 1.48, and 1.52, respectively. The knee OA population in this study well represented that in the U.S.

Knees treated with the peptide of SEQ ID No: 10 (Index knees) demonstrated a statistically significant delay in pathological 3D bone shape changes shown by femur B-score change as compared to placebo-exposed knees (Control knees) at both 6 and 12 months. In the first six months, the B-score trajectory of Index knees was very similar to that of non-OA knees in the OAI database, while that of Control knees was very similar to that of OA knees in the OAI database. See FIG. 2.

With regard to clinical benefits, Index knees demonstrated statistically significant improvements in KOOS ADL as compared to Control knees at both 6 and 12 months (See FIG. 3). Index knees also exhibited improvements in KOOS Pain and all other KOOS subscales as compared to Control knees, but their differences did not reach statistical significance. WOMAC Function, which shares the same questionnaire as KOOS ADL, unsurprisingly showed the same statistically significant results as KOOS ADL, while improvements in WOMAC Pain, Stiffness, and Total in Index knees did not show statistical significance as compared to Control knees.

In order to identify responders to the treatment, each knee joint bone of all study participants was stratified by its B-score before start of treatment ("Baseline B-Score") without regard to any other clinical and imaging parameters.

The stratification was conducted by the Baseline B-Scores of femur, tibia, and patella, respectively, for Index and Control knees, respectively.

Clinical Improvements in the Knees with Higher Femur Baseline B-Score

Table 1 shows the numbers of Index and Control knees in each femur Baseline B-score cohort. Mean femur B-scores of Index and Control knees at baseline were very similar in each cohort as shown in the table.

TABLE 1

Number of Knees and Mean B-scores in Each Femur Baseline B-Score Cohort

| Femur Baseline | Number of Knees | | Mean Baseline B-Score | |
|---|---|---|---|---|
| B-Score | Index | Control | Index | Control |
| All | 78 | 78 | 1.48 | 1.48 |
| <0.0 | 16 | 17 | −0.68 | −0.43 |
| >0.0 | 62 | 61 | 2.04 | 2.02 |
| >0.5 | 50 | 52 | 2.46 | 2.31 |
| >1.0 | 42 | 40 | 2.78 | 2.78 |
| >1.5 | 35 | 35 | 3.08 | 3.02 |

Table 2 shows the demographic information of each cohort. There was no difference among these cohorts and all knees. Also, no difference was observed between Index and Control knees in any cohort.

TABLE 2

Demographics of Each Femur Baseline B-Score Cohort

| Severity Cohort | Gender - Index | | Gender - Control | | Mean Age | | | Mean BMI | | |
|---|---|---|---|---|---|---|---|---|---|---|
| | Male | Female | Male | Female | Index | Control | Ind vs Cont (P) | Index | Control | Ind vs Cont (P) |
| All (N = 78) | 30 | 48 | 30 | 48 | 58.4 | 58.4 | 1.00 | 30.9 | 30.9 | 1.00 |
| ≥0 | 23 | 39 | 24 | 37 | 58.6 | 58.8 | 0.90 | 31.5 | 31.6 | 0.95 |
| ≥0.5 | 20 | 30 | 19 | 33 | 59.3 | 60.0 | 0.73 | 31.8 | 31.6 | 0.90 |
| ≥1.0 | 17 | 25 | 15 | 25 | 59.2 | 61.0 | 0.42 | 32.1 | 32.3 | 0.90 |
| ≥1.5 | 12 | 23 | 13 | 22 | 59.9 | 61.2 | 0.58 | 32.0 | 32.6 | 0.74 |

Since the knees in each cohort were not necessarily from the same patients, and the numbers of Index and Control knees in each cohort were not the same, statistical analysis to compare Index and Control knees in each cohort was conducted by unpaired and unequal variance Student t-test.

In terms of the efficacies on pathological 3D bone shape change, the higher the femur Baseline B-Score, the steeper the trajectory of B-score increase in Control knees. See FIG. 4. This matched with the observations in the large OAI-based natural history study that pathological 3D bone shape change is accelerated in more knees with more severe (higher Baseline B-Score) OA.

On the other hand, B-score increase in Index knees demonstrated a very similar degree of reduction in all cohorts. As a result, the margin of B-score changes between Index and Control knees increased was greatest in the cohorts with higher femur Baseline B-Score. See FIG. 4.

Of special note, the trajectory of B-score increase in Index knees during the first 6 months was very similar to that of non-OA knees from the OAI database in all cohorts. The slope of the trajectory of Index knees between 6 and 12 months became steeper, suggesting that the efficacy of the peptide of SEQ ID No: 10 on pathological 3D bone shape change was less in the latter 6 months of the 12-month study. Nevertheless, the B-score margin between Index and Control knees at 6 months was maintained through 12 months in all cohorts.

In terms of clinical benefits, Index knees demonstrated more robust knee function improvements as compared to Control knees as measured by KOOS ADL/WOMAC Function in the cohorts with higher femur Baseline B-Score. See FIG. 5. Of note, the efficacy observed in Control knees was lower at all time points in the higher femur Baseline B-Score cohorts, suggesting that effects of saline placebo were more limited in more advanced OA.

Pain improvement in Index knees as compared to Control knees was also more robust in the cohorts with higher femur Baseline B-Score. See FIG. 6. Similarly, to knee function, pain improvement in Control knees was lower in the higher femur Baseline B-Score cohorts.

In Index knees, robust pain improvement appeared later (at 12 months) than did functional improvement. The patients in this study typically had suffered from long-term (chronic) OA pain prior to enrollment into this study. Peripheral and central sensitization of pain pathways in the nervous system occurs in chronic pain patients (Dürsteler 2020), including those with OA. Reversal or resolution of pain sensitization may require many months to years (Greenwald 2018), independent of restoration of function, as seen after joint replacement (Wylde 2015). Presumably, the peptide of SEQ ID No: 10 started to ameliorate pathological 3D bone shape change early on (within 3-6 months), which improved knee function, while it took several months longer (12 months) for the significant reductions in pain that were seen among more severely-affect OA patients, as measured by baseline femur B-Score.

Table 3 summarizes the p-values of major WOMAC and KOOS subscales between Index and Control knees at 12 months in the cohorts with femur Baseline B-Scores of ≥1.0 and ≥1.5.

TABLE 3

P-values of Major WOMAC and KOOS Subscales between Index and Control Knees at 12 Months in the Cohorts with Femur Baseline B-Score ≥ 0

| Knee OA Clinical | | Femur Baseline B-Score | |
|---|---|---|---|
| Measures | Subscales | ≥1.0 | ≥1.5 |
| WOMAC | Function | 0.03 | 0.01 |
| | Pain | 0.05 | 0.02 |
| KOOS | Total | 0.03 | 0.008 |
| | Activities of Daily Living | 0.03 | 0.01 |
| | Pain | 0.03 | 0.005 |

Clinical Improvements in the Knees with Higher Patella Baseline B-Score

Similar stratified analyses using patella Baseline B-Score were also conducted.

Patella Baseline B-score distributions of Index and Control knees were very similar. Although the patella distribution range was similar to that of femur, the mean patella Baseline B-Scores of Index and Control knees were 0.95 and 1.01, respectively, which were approximately 0.5 points lower than those of femur.

Table 4 shows the numbers of Index and Control knees, as well as mean patella Baseline B-Scores in each patella Baseline B-score cohort. Mean patella B-scores of Index and Control knees at baseline were very similar in each cohort.

TABLE 4

Number of Knees and Mean Baseline B-scores in Each Patella Baseline B-Score Cohort

| Patella Baseline | Number of Knees | | Mean Baseline B-Score | |
|---|---|---|---|---|
| B-Score | Index | Control | Index | Control |
| All | 78 | 78 | 0.95 | 1.02 |
| <0.0 | 20 | 19 | −1.06 | −1.12 |
| >0.0 | 58 | 59 | 1.65 | 1.71 |
| >0.5 | 49 | 48 | 1.90 | 2.03 |

Table 5 shows the demographics of Index and Control knees in each patella Baseline B-score cohort. The proportion of males was greater in the higher patella Baseline B-Score cohorts; otherwise, the demographics were very similar among all cohorts.

TABLE 5

Demographics of Each Patella Baseline B-Score Cohort

| | | | | | Mean Age | | | Mean BMI | | |
|---|---|---|---|---|---|---|---|---|---|---|
| Severity | Gender - Index | | Gender - Control | | | | Ind vs | | | Ind vs |
| Cohort | Male | Female | Male | Female | Index | Control | Cont (P) | Index | Control | Cont (P) |
| All (N = 78) | 30 | 48 | 30 | 48 | 58.4 | 58.4 | 1.00 | 30.9 | 30.9 | 1.00 |
| ≥0 | 28 | 30 | 29 | 30 | 58.3 | 58.9 | 0.73 | 32.0 | 31.7 | 0.79 |
| ≥0.5 | 26 | 23 | 27 | 21 | 58.8 | 59.8 | 0.61 | 32.0 | 32.1 | 0.92 |
| ≥1.0 | 23 | 15 | 23 | 14 | 61.1 | 61.0 | 0.97 | 31.6 | 32.6 | 0.48 |

Interestingly, in the higher patella Baseline B-Score cohorts, the slope of the trajectory of concomitant femur B-score change in Control knees was steeper. As seen in the femur Baseline B-Score cohort analysis, Index knees consistently demonstrated clear reductions of B-score change as compared to Control knees, and the group differences were greater in cohorts with higher patella Baseline B-Scores.

In terms of clinical benefits, Index knees demonstrated more robust and statistically significant improvements as compared to Control knees in knee function as measured by KOOS ADL/WOMAC Physical Function in the cohorts with higher patella Baseline B-Scores. See FIG. 7.

Pain improvement in Index knees as compared to Control knees was also more robust and significant in the cohorts with higher patella Baseline B-Score. See FIG. 8.

Table 6 summarizes the p-values of major WOMAC and KOOS subscales between Index and Control knees at 6 and 12 months in the cohorts with patella Baseline B-Scores of ≥0.0 and ≥0.5.

TABLE 6

P-values of Major WOMAC and KOOS Subscales between Index and Control Knees at 12 Months in the Cohorts with Patella Baseline B-Score ≥ 0

| Knee OA Clinical | | Patella Baseline B Score | |
|---|---|---|---|
| Measures | Subscales | ≥0.0 | ≥0.5 |
| WOMAC | Function | 0.04 | 0.02 |
| | Pain | 0.09 | 0.09 |
| KOOS | Total | 0.04 | 0.02 |
| | Activities of Daily Living | 0.04 | 0.02 |
| | Pain | 0.05 | 0.04 |

Clinical Improvements in Knees with Higher Baseline B-Scores in Both Femur and Patella Treatment differences between Index and Control knees increased in different ways in the higher femur Baseline B-Score cohorts versus the higher patella Baseline B-Score cohorts. While the former (higher femur baseline B-score) showed relatively rapid decreases in placebo responses in the Control knees, the latter (higher patella baseline B-score) demonstrated greater improvements in Index knees. These patterns were common in improvements in both functional and pain measures.

This suggests that pathological 3D bone shape changes in femur and patella may influence clinical benefits (function, pain, etc.) by different mechanisms and/or in different timeframes.

If so, the clinical benefit differences between Index and Control knees may increase further when both femur and patella Baseline B-Scores are used to select knees most likely to benefit from treatment. To examine this hypothesis, additional stratified analyses were conducted combining femur and patella Baseline B-Score cohorts.

Table 7 shows the numbers of Index and Control knees in each combined femur/patella Baseline B-score cohort. Mean Baseline B-scores of femur and patella, respectively, were similar between Index and Control knees in all cohorts.

TABLE 7

Number of Knees and Mean Baseline B-Scores of Femur and Patella in Each Cohort Combining Femur and Patella Baseline B-Scores

| Baseline B-Score | | Number of Knees | | Mean Baseline B-Scores | | | |
|---|---|---|---|---|---|---|---|
| | | | | Femur | | Patella | |
| Femur | Patella | Index | Control | Index | Control | Index | Control |
| All | All | 78 | 78 | 1.48 | 1.48 | 0.95 | 1.02 |
| ≥1.0 | All | 42 | 40 | 2.78 | 2.78 | 1.46 | 1.59 |
| ≥1.0 | ≥0.0 | 35 | 33 | 2.90 | 2.97 | 1.95 | 2.09 |
| ≥1.0 | ≥0.5 | 31 | 30 | 2.99 | 2.60 | 2.17 | 2.00 |
| ≥1.5 | All | 35 | 35 | 3.08 | 3.02 | 1.60 | 1.75 |
| ≥1.5 | ≥0.0 | 29 | 29 | 3.23 | 3.22 | 2.12 | 2.24 |
| ≥1.5 | ≥0.5 | 27 | 26 | 3.32 | 2.81 | 2.35 | 2.13 |

In these combined femur/patella Baseline B-Score cohorts, B-score changes showed similar patterns to those in the earlier stratified analyses with femur or patella Baseline B-Score cohorts.

Within the same patella Baseline B-Score cohorts, the slope of the trajectory of femur B-score change in Control knees was steeper in the higher femur Baseline B-Score cohorts.

Likewise, in the same femur Baseline B-Score cohorts, the slope of the trajectory of femur B-score change in Control knees was steeper in the higher patella Baseline B-Score cohorts.

In all combined femur/patella Baseline B-Score cohorts, Index knees showed reductions in B-score changes as compared to Control knees in both femur and patella at 6 and 12 months.

In all cohorts with patella Baseline B-Score ≥0 and femur Baseline B-Score ≥1, Index knees showed a statistically significant reduction in femur B-score change at 6 months. Also, the difference between Index and Control knees in favor of treatment at 6 months increased as the Baseline B-Scores of femur and/or patella increased.

In terms of clinical benefits, Index knees demonstrated more robust improvements as compared to Control knees with respect to knee function, pain, and other WOMAC and KOOS subscales in the cohorts with higher combined femur/patella Baseline B-Score cohorts. See FIGS. 9 and 10.

Surprisingly, cohorts with higher femur/patella Baseline B-Scores showed both reduced placebo effects in Control knees and increased function, pain, and other clinical benefits in Index knees, increasing the efficacy differences between Index and Control knees Tables 8 and 9 summarize the statistical analysis results of WOMAC and KOOS subscales, respectively, between Index and Control knees at 3, 6, and 12 months in the combined femur/patella Baseline B-Score cohorts.

TABLE 8

Statistical Analysis Results of WOMAC Subscales between Index and Control Knees at 3, 6, and 12 Months in the Combined Femur/Patella Baseline B-Score Cohorts

| Knee OA Clinical Measures | Subscales | Baseline B Score | | Time Point | | |
|---|---|---|---|---|---|---|
| | | Femur | Patella | 3 Months | 6 Months | 12 Months |
| WOMAC | Function | ≥1.0 | Any | 0.06 | 0.08 | 0.03 |
| | | | ≥0 | 0.05 | 0.01 | 0.02 |
| | | | ≥0.5 | 0.05 | 0.004 | 0.01 |
| | | ≥1.5 | Any | 0.03 | N.S. | 0.01 |
| | | | ≥0 | 0.04 | 0.02 | 0.01 |
| | | | ≥0.5 | 0.04 | 0.01 | 0.003 |
| | Pain | ≥1.0 | Any | N.S. | N.S. | 0.05 |
| | | | ≥0 | N.S. | N.S. | 0.01 |
| | | | ≥0.5 | N.S. | N.S. | 0.008 |
| | | ≥1.5 | Any | N.S. | N.S. | 0.02 |
| | | | ≥0 | N.S. | N.S. | 0.005 |
| | | | ≥0.5 | N.S. | N.S. | 0.002 |
| | Stiffness | ≥1.0 | Any | N.S. | N.S. | N.S. |
| | | | ≥0 | N.S. | N.S. | N.S. |
| | | | ≥0.5 | N.S. | N.S. | 0.07 |
| | | ≥1.5 | Any | N.S. | N.S. | N.S. |
| | | | ≥0 | N.S. | N.S. | 0.05 |
| | | | ≥0.5 | N.S. | N.S. | 0.02 |
| | Total | ≥1.0 | Any | N.S. | N.S. | 0.03 |
| | | | ≥0 | N.S. | 0.02 | 0.02 |
| | | | ≥0.5 | N.S. | 0.009 | 0.007 |
| | | ≥1.5 | Any | 0.09 | N.S. | 0.008 |
| | | | ≥0 | 0.09 | 0.05 | 0.005 |
| | | | ≥0.5 | 0.09 | 0.03 | 0.002 |

TABLE 9

Statistical Analysis Results of KOOS Subscales between Index and Control Knees at 3, 6, and 12 Months in the Combined Femur/Patella Baseline B-Score Cohorts KOOS Sports and Recreation and Symptom subscales did not show statistical significance and are not included in this table.

| Knee OA Clinical Measures | Subscales | Baseline B Score | | Time Point | | |
|---|---|---|---|---|---|---|
| | | Femur | Patella | 3 Months | 6 Months | 12 Months |
| KOOS | Activities of Daily Living | ≥1.0 | Any | 0.06 | 0.08 | 0.03 |
| | | | ≥0 | 0.05 | 0.01 | 0.02 |
| | | | ≥0.5 | 0.05 | 0.004 | 0.01 |
| | | ≥1.5 | Any | 0.03 | N.S. | 0.01 |
| | | | ≥0 | 0.04 | 0.02 | 0.01 |
| | | | ≥0.5 | 0.04 | 0.01 | 0.003 |
| | Pain | ≥1.0 | Any | N.S. | N.S. | 0.03 |
| | | | ≥0 | N.S. | N.S. | 0.01 |
| | | | ≥0.5 | N.S. | N.S. | 0.006 |
| | | ≥1.5 | Any | N.S. | N.S. | 0.005 |
| | | | ≥0 | N.S. | N.S. | 0.002 |
| | | | ≥0.5 | N.S. | N.S. | 0.001 |
| | Knee-related QOL | ≥1.0 | Any | N.S. | N.S. | N.S. |
| | | | ≥0 | N.S. | N.S. | 0.07 |
| | | | ≥0.5 | N.S. | N.S. | 0.05 |
| | | ≥1.5 | Any | N.S. | N.S. | 0.08 |
| | | | ≥0 | N.S. | 0.08 | 0.03 |
| | | | ≥0.5 | N.S. | N.S. | 0.02 |

Clinical Improvements in Knees with Lower Baseline B-Score

The results above demonstrated that the higher Baseline B-Score cohorts show more rapid and robust clinical benefits in response to the treatment.

FIG. 11 shows femur B-score changes of Index and Control knees with femur Baseline B-Score <0 for 30 months.

Control knees showed a modest increase in femur B-score during the first 6 months, which the slope of the trajectory became slightly steeper between 6 and 12 months, indicating an acceleration of pathological 3D bone shape change. The slope further increased between 12 and 30 months, becoming similar to that of OA knees from the OAI database. As described above, knees with more severe OA typically show a faster increase in pathological B-score over time.

Index knees showed a similar trajectory of B-score change to that of non-OA knees from the OAI database for the first 6 months and appeared to reverse the pathological 3D bone shape change from 6 to 12 months. The femur B-score of Index knees increased from 12 to 30 months and exceeding the trajectory of non-OA knees by 30 months.

Although not statistically significant, treatment appeared to modify the pathological 3D bone shape change of Index knees for longer than 12 months.

FIG. 12 demonstrates KOOS ADL/WOMAC Function score changes of Index and Control knees with femur Baseline B-Score <0 over the 30 months period.

While the functional improvement was not statistically significant in Index knees with femur Baseline B-Score <0 compared to that in Control knees for the first 12 months, there was statistically significant improvement at 30 months.

In knees with femur Baseline B-Scores ≥0, neither structural nor clinical benefit in the Index knees as compared to Control knees was evident at 30 months, indicating that the single treatment series was no longer effective in modifying knee OA by that time.

These long-term (30-month) follow-up data, in combination with the 12-month data, indicate that the peptide of SEQ ID No: 10 exhibited structural and clinical efficacy in all knees with clinical OA, regardless of their degree of baseline OA severity by B-score, in different manners as follows:

In more severe cohorts, robust structural and clinical efficacies appeared early after treatment. Structural efficacy, as measured by reduced bone shape change, declined after 6 months and was not evident by 30 months. The clinical efficacy (WOMAC, KOOS) remained significant until at least 12 months after treatment and was no longer evident at 30 months.

In less severe OA cohorts, efficacy was less impressive for the first 12 months. However, treatment benefits seen at 30 months suggested delayed OA progression even in these less afflicted cohorts.

Femur and Patella B-Score for Prediction of Clinical Benefits in Response to an OA Therapy These analyses demonstrated that knees with higher Baseline B-Scores show more robust and faster patient-reported clinical improvements in function and pain in response to treatment by the peptide of SEQ ID No: 10.

On the other hand, the knees with lower Baseline B-Scores, in particular, those with Baseline B-Scores <0, exhibited clinical improvements that appeared at later timepoints after treatment.

As described in the Background section, subjective measures are not necessarily reliable for assessing overall OA disease severity because individual threshold of PROs may vary significantly from patient to patient, and even within and individual patient. There is no objective measure for pain and dysfunction experienced by an individual.

The most critical aspect of the present invention is that clinical benefits provided by a treatment, which are subjectively reported by the patients, can be predicted by an objective diagnostic method, and patient selection for the intervention can be improved.

Although other (semi-objective) OA predictive methods have been used to identify patients such as cartilage thickness by X-Ray or MRI, drug-associated changes in these measures have failed to demonstrate a correlation or association with patient-reported clinical benefits.

OA is a multi-factorial disease, with several clinical phenotypes that are incompletely characterized, making patient selection for treatments complicated and challenging.

The present invention offers a simple and reliable method to predict treatment responsiveness of an OA patient.

As described in the Background section, B-score is objectively measured using conventional MRI and a statistical shape modeling algorithm such as Active Appearance Model (AAM).

B-scores of either femur or patella, or combination thereof, can be used to predict patient-reported clinical benefits in response to a treatment that is proven or expected to provide clinical benefits such as the peptide of SEQ ID No: 10.

B-scores of the tibia did not show such predictability.

To date, pathological 3D shape changes of subchondral bones in a joint have been studied primarily in the knee joint. However, it is highly likely that 3D subchondral bone shape change plays a critical role in OA progression in other joints. Once similar scoring systems of 3D shapes of subchondral bones are established for other joints, the method of the present invention can be used in those joints.

Since it is known that joint trauma triggers subchondral bone change, the present invention should be applicable to joint trauma. It could be useful in predicting treatment response in rheumatoid arthritis and other arthritides as well.

Because the peptide of SEQ ID No: 10 and its least homologous rat orthologue, the peptide of SEQ ID No: 14, are known to effect human and rat bone cells interchangeably and all known orthologues including these two shares a consensus sequence of SEQ ID No: 1, the present invention is applicable to any peptides sharing the peptide of SEQ ID No: 1.

The present invention is also applicable to other compounds that share the same mechanism of action with the peptide of SEQ ID No: 10, which is the modification of pathological 3D shape change of subchondral bones in a joint.

The peptides sharing the SEQ ID No: 1 such as the peptides of SEQ ID No: 10 and 12 selectively bind to integrin $\alpha_V\beta_3$ expressed by osteocytes.

Since this action to the integrin $\alpha_V\beta_3$ expressed by osteocytes is believed to trigger the modification of pathological 3D shape change of subchondral bones, the present invention is applicable to any compound that selectively binds to integrin $\alpha_V\beta_3$ expressed by osteocytes.

The present invention can be used for other therapies such as analgesic or anti-inflammatory therapies, which do not necessarily affect joint structures. Each of them should have its characteristic Baseline B-Score cohort that the therapy shows its best efficacy profile.

Method to Predict Clinical Benefits in Response to a Treatment of an OA Joint

A new diagnostic method is presented to identify an OA knee that is likely to respond to a treatment and show clinical benefits.

The method comprises measuring B-scores of femur and/or patella of a knee and selecting the one that is responsive to a treatment.

When the femur B-score is used, a B-score ≥0 is used as a threshold to select a knee that is likely to respond to treatment with improved function, reduced pain, and/or other clinical benefits within 12 months of the treatment.

The higher the Baseline B-Score is, the better are the clinical benefits expected in response to treatment. For example, a knee with femur B-score ≥0.5 is expected to have a better and/or faster treatment response than ≥0, ≥1 is better than ≥0.5, and ≥1.5 is better than ≥1.0.

When the patella B-score is used, the patella B-score ≥0 is used as a cut off to select a knee that is likely to respond to a treatment with improved function, pain, and/or other clinical benefits within 12 months of the treatment.

The higher the Baseline B-Score is, the better are the clinical benefits expected in response to treatment. For example, the knee with a patella B-score ≥0.5 is expected to have better clinical response than a knee with patella B-score ≥0.

The thresholds of both femur and patella B-scores described above can be used in combination.

This method is particularly useful when a treatment is proven or expected to modify the pathological 3D shape change of the femur and/or patella.

An example of such treatment is administration of one of the peptides having a consensus amino acid sequence of DLXXRGDNDXXPFSGDGXXF (SEQ ID No: 1), wherein X is any amino acid.

More specifically, the peptide can be selected from the peptides of SEQ ID No: 2-14 below, wherein X is any amino acid.

```
                                       (SEQ ID No: 2)
DLQERGDNDISPFSGDGQPF (SEQ ID No: 3)
DLQERGDNDMSPFSGDGQPF (SEQ ID No: 4)
DLQGRGDNDLSPFSGDGPPF (SEQ ID No: 5)
DLLVRGDNDVPPFSGDGQHF (SEQ ID No: 6)
DLXXRGDNDXXPFSGDGXXFKD (SEQ ID No: 7)
DLQERGDNDISPFSGDGQPFKD (SEQ ID No: 8)
DLQERGDNDMSPFSGDGQPFKD (SEQ ID No: 9)
DLQGRGDNDLSPFSGDGPPFKD (SEQ ID No: 10)
TDLQERGDNDISPFSGDGQPFKD (SEQ ID No: 11)
TDLQERGDNDMSPFSGDGQPFKD (SEQ ID No: 12)
PDLQERGDNDISPFSGDGQPFKD (SEQ ID No: 13)
PDLQGRGDNDLSPFSGDGPPFKD (SEQ ID No: 14)
PDLLVRGDNDVPPFSGDGQHFMH
```

Any of the peptides can be either a linear or a cyclic peptide.

In a preferred embodiment, the peptide is the peptide of SEQ ID No: 10.

Another preferred peptide is the peptide of SEQ ID No: 12.

Additional preferred embodiment is administration of a therapeutic compound that selectively binds to integrin $\alpha_V\beta_3$ expressed by osteocytes. The compound preferably has at least 3 times higher binding affinity to integrin $\alpha_V\beta_3$ than integrin $\alpha_V\beta_3$, and at least 300 times higher binding affinity to integrin $\alpha_V\beta_3$ than all other integrins.

Such therapeutic compound can be any type of compounds including a non-peptide compound. An antibody selective to integrin $\alpha_V\beta_3$ is within the preferred embodiment.

Preferably, the binding of any one of the above compounds to integrin $\alpha_V\beta_3$ is agonistic.

Administration of these compounds is preferably intra-articular injection but can also be subcutaneous, topical, and oral.

This method can be used for other types of therapies that are known or supposed to have an efficacy on function, pain, or other clinical benefits.

The clinical benefits that can be predicted by this method are patient-reported outcomes (PROs) including, but not limited to, function, pain, stiffness, knee-related quality of life, and total condition of the knee.

These PROs can be measured by one or more of the widely used PRO measures including, but not limited to: WOMAC (Western Ontario and McMaster Universities Osteoarthritis Index), KOOS (Knee injury and Osteoarthritis Outcome Score), VAS (Visual Analogue Scale), and NRS (Numerical Rating Scale) measurement tools.

This method can be applied to knees affected by trauma, rheumatoid arthritis, and other arthritides.

This method can be applied to other joints than knees affected by OA, trauma, rheumatoid arthritis, and/or other arthritides using an adequate measures of 3D joint bone shape specific to the joint.

Method to Treat Knee OA

The present invention includes a new method of treating knee OA.

The method comprises measuring B-score of a femur and/or patella of an OA knee and determine the dose and treatment frequency of a therapeutic agent that is expected to show a clinical benefit.

For example, when a knee with a femur B-score ≥0 is treated with a peptide of SEQ ID No: 10, one series of treatment consisting of four-time intra-articular or subcutaneous injections of an effective dose (e.g., 200 mg/dose) on days 0, 7, 14, and 21 can be used every 12 months to obtain clinically meaningful function and pain improvements. For a knee with a femur B-score <0, one series every 30 months is sufficient to expect similar results (See FIGS. 11 and 12).

As shown in FIG. 4, the higher the B-score is, the faster the treatment effect on the pathological 3D bone shape change is faded particularly after 6 months of the treatment. Therefore, a more frequent treatment than one series per 12 months may be given depending on the results of B-score measurement from time to time.

A very similar treatment regimen based on measured B-score can be used for a group of peptides having a consensus SEQ ID No: 1.

This method of treatment is particularly useful for any OA therapy that modifies pathological 3D shape change of subchondral bones in the knees and/or other joint.

This method is also useful when treating a traumatic knee because it is known to be associated with sclerosis and 3D shape change of subchondral bones.

Another embodiment of this invention is a new method of designing a clinical study of knee OA.

An OA therapy cannot be approved without demonstrating clinically meaningful and statistically significant (as compared to a control) improvement in clinical benefits such as pain and/or function.

Depending on the targeted treatment regimen of an OA therapy to be tested in a clinical study, a patient population with specific B-score threshold can be selected for enrollment to its clinical efficacy-proving study.

For example, when a therapy with a similar clinical efficacy profile to the peptide of SEQ ID No: 10 is tested in knee OA and the planned follow-up period is 12 months, enrolling the patients with femur B-score ≥1 and/or patella B-score ≥0 would make the clinical study efficient in that the clinical efficacy can be demonstrated with a modest number of patients such as less than 50 in drug and placebo arms, respectively.

Overall, a significant benefit of the present invention is that the new methods herein makes decisions related to treatment and implementation of OA treatment highly efficient whether it is used in clinical practice or in a clinical trial.

EXAMPLES

The following examples are put forth so as to provide those of ordinary skill in the art with a complete disclosure and description of how to make and use the present invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Clinical and Structural Efficacies of a Peptide that Binds to Integrins on Bone and Cartilage Cells Clinical Study Methodology
Outline of the Study A peptide of SEQ ID No: 10 was tested for its clinical safety as well as clinical and structural efficacies in mild to severe knee OA patients.

A multicenter, randomized double-blind, placebo-controlled study was designed to investigate the safety, tolerability, pharmacokinetics, and efficacy of the peptide of SEQ ID No: 10 administered in four weekly doses in subjects with bilateral knee osteoarthritis. The study was conducted under an open IND (investigational new drug application) at CDER (Center for Drug Evaluation and Research) of the U.S. FDA (The United States Food and Drug Administration) in compliance with GCP (Good Clinical Practice) and ICH (International Conference on Harmonization of Technical Requirements for Registration of Pharmaceuticals for Human Use) guidelines. Eighteen (18) orthopedic, rheumatologic and family practice centers in the U.S. participated in the study.

The study was divided into Part A and Part B. The Part A was designed to evaluate safety of intra-articular (I.A.) administration of the peptide of SEQ ID No: 10 at different dosing levels (20, 50, 100, or 200 mg per injection in sequential cohorts) in the subjects with osteoarthritis of the knees and to select a dose for Part B. Part B was to evaluate safety and efficacy of the selected dose of the peptide of SEQ ID No: 10.

The 200 mg dose was selected for Part B. Data from 93 subjects was qualified for drug efficacy analysis of clinical benefits (pain, function, etc.), each of whom received 4 once-weekly injections of 200 mg/dose of the peptide of SEQ ID No: 10 in the Index knee and identical placebo in the contralateral knee (Control knees), as randomly assigned. No other doses of drug or placebo were administered. All subjects visited their respective clinical sites at 3, 6, and 12 months after the first dosing for their safety and efficacy assessments.

MRI of both knees were obtained from these 93 subjects at baseline, 6 and/or 12 months. They were sent to the central readers of cartilage thickness and 3D bone shape, respectively. Both central readers were blinded to treatment assignment and clinical data throughout their analysis process.

For the 3D bone shape analyses, its central reader first made a qualification review of all MRI images from the 93 subjects since they were obtained primarily for cartilage thickness measurement. The images from 15 subjects were removed from the analysis as they did not provide sufficient quality for 3D bone shape analysis.

MRIs from the remaining 78 subjects (156 knees: 78 Index and 78 Control) were qualified for analysis of 3D bone shape (B-scores of femur, tibia, and patella).

Screening of the Subjects

After informed consent was obtained, subjects underwent a clinical and laboratory screening evaluation at which their preliminary eligibility for the study was evaluated. Screening included the following procedures:
  Medical history including medication history
  Focused physical examination
  Vital signs including resting blood pressure, pulse, respiratory rate, and temperature
  Weight, height, and BMI
  X-ray of the knees (if not obtained within 3 months of screening)
  Laboratory evaluations including hematology, coagulation profile, comprehensive metabolic panel, etc.
  Recording of concomitant medications Subjects who met all clinical and laboratory eligibility criteria underwent standardized bilateral knee MRIs.

Inclusion and Exclusion Criteria

Inclusion and exclusion criteria for screening of the subjects for either Part A or Part B were as follows:

Inclusion Criteria
  1. Age ≥25 and ≤75
  2. Patello-femoral osteoarthritis of both knees of mild to moderate severity with intact meniscus and ligamentous stability (cruciate and collateral ligaments)
    Clinically, as determined by screening questionnaire, judgment of the Principal Investigator (may be supporting by imaging studies of knees); confirmed by centrally read screening MRI of both knees, of ICRS Grade 1-3, or Grade 4 with only focal defects, no defect greater than 1cm.
    Meniscus intact (MRI degenerative signal up to and including grade II acceptable)
    Cruciate and collateral ligament stability as defined by clinical examination
  3. Able to read, understand, sign and date the subject informed consent 4. Willingness to use only acetaminophen as the primary analgesic (pain-relieving) study medication. The maximum dose of acetaminophen must not exceed 4 grams/day (4000 mg) per day.
5. Willingness to use only hydrocodone/acetaminophen or hydrocodone alone for breakthrough pain during the injection period (through study day 30).
6. Willingness not to use non-steroidal anti-inflammatory drugs (NSAIDS) such as aspirin, ibuprofen or naproxen for the first 30 days of the study.
7. Female subjects of childbearing potential who are sexually active (non-abstinent) must agree to and comply with using 2 highly effective methods of birth control (oral contraceptive, implant, injectable or indwelling intrauterine device, condom with spermicide, or sexual abstinence) while participating in the study.

Exclusion Criteria
1. Contraindication to MRI, including metallic fragments, clips or devices in the brain, eye, or spinal canal; implanted devices that are magnetically programmed; weight >300 lbs.; moderate or severe claustrophobia; previous intolerance of MRI procedure
2. ICRS greater than Grade 3, excepting Grade 4 with focal defects no greater than 1 cm as confirmed by centrally-read screening MRI
3. MRI evidence of inflammatory or hypertrophic synovitis, or significant chondral calcification
4. Prior surgery in the knee, excluding procedures for debridement only
5. Knee joint replacement or any other knee surgery planned in the next 12 months
6. History of rheumatoid arthritis, psoriatic arthritis, or any other autoimmune or infectious cause for arthritis
7. Knee effusion >2+ on the following clinical scale:
Zero=No wave produced on downstroke
Trace=Small wave on medial side with downstroke
1+=Larger bulge on medial side with downstroke
2+=Effusion spontaneously returns to medial side after upstroke (no downstroke necessary)
3+=So much fluid that it is not possible to move the effusion out of the medial aspect of the knee
8. Last viscosupplementation (e.g., Synvisc® or similar hyaluronic acid product) injected into either knee <3 months before screening
9. Last intra-articular knee injection of corticosteroids <2 months before screening
10. Use of any steroids (except inhaled corticosteroids for respiratory problems) during the previous month before screening
11. Known hypersensitivity to the peptide of SEQ ID No: 3
12. Known hypersensitivity to acetaminophen or hydrocodone
13. History of arthroscopy in either knee in the last 3 months before screening
14. History of septic arthritis, gout or pseudo-gout, of either knee in previous year before screening
15. Clinical signs of acute meniscal tear (e.g., locking or new acute mechanical symptoms consistent with meniscal tear)
16. Patellar chondrocalcinosis on X-Ray
17. Skin problem, rash or hypersensitivity, affecting either knee at the injection site
18. Bleeding problem, platelet or coagulation deficiency contraindicating intra-articular injection
19. Active systemic infection
20. Current treatment or treatment within the previous 2 years prior to the Screening Visit for any malignancy except basal cell or squamous cell carcinoma of the skin, unless specific written permission is provided by the Sponsor's medical monitor
21. Women of childbearing potential who are pregnant, nursing, or planning to become pregnant, and those who do not agree to remain on an acceptable method of birth control throughout the entire study period
22. Participation in other clinical osteoarthritis drug studies, with the exception of analgesic studies, within one year prior to screening
23. Currently taking Paclitaxel (mitotic inhibitor), and or Natalizumab (anti-integrin).
24. History of significant liver disease or consumption of more than 3 alcoholic drinks a day. (Definition of one alcoholic drink: 12-ounces of beer, 8-ounces of malt liquor, 5-ounces of wine, 1.5-ounces or a "shot" of 80-proof distilled spirits or liquor such as gin, rum, vodka, or whiskey).

Randomization

If all clinical inclusion and exclusion criteria were met, MRIs of both knees were obtained and evaluated by a central reader to determine the ICRS grade (gICRS) of each knee as the final screening criterion. If the cartilage of patello-femoral compartment in both knees fell within ICRS grades 1-3, or 4 with only small focal defects no greater than 1 cm, the subject was registered. The randomization center randomized each subject to either "Right knee active" or "Left knee active". The active knee was to receive the peptide of SEQ ID No: 10 and the contralateral knee was to receive identical placebo.

For enrolled subjects, there was within-subject randomization, such that one knee received active drug injections, and the contralateral knee received identical placebo injections. As two knees within a person form a matched set, the effects of individual-level confounders (e.g., level of activity, genetic and epigenetic factors, pain threshold) are eliminated, increasing the power of the study to detect a treatment effect if one is present.

Any subject who was randomized in Part A was excluded from enrollment in Part B.

Dosing

On the first dosing day, the randomized subjects were assessed by physical examinations and vital signs. Further, they completed the Knee injury and Osteoarthritis Outcome Score (KOOS), which includes the Western Ontario and McMaster Universities Osteoarthritis Index (WOMAC). The KOOS questionnaire assesses knee-specific activities of daily living, sports and recreation, knee-related quality of life, other symptoms such as stiffness, and knee pain. The KOOS has been used extensively in longitudinal studies of knee osteoarthritis. After assessments were completed, subjects received one intra-articular injection in each knee, with each injection prepared from the vial(s) marked for that knee. One knee received the peptide of SEQ ID No: 10, and the contralateral knee received placebo with subject, site, and sponsor blinded to treatment assignment. Subjects were monitored for adverse events during the injections and for a few hours after the injections. Vital signs were also monitored after the injections.

On the 7th, 14th, and 21st days after the first dosing, subjects received the second, third, and fourth (last) dosing of the same study materials, respectively. Safety and adverse event assessments were obtained as on the first dosing day.

Post-Treatment Follow-Up

Subjects returned to their respective study sites at 3, 6 and 12 months after the first dosing day for follow-up evaluations. In addition, the study sites monitored the subject's condition through telephone contact 9 months after the first dosing day. During the 3, 6, and 12 months post-treatment, subjects were evaluated on site with physical examinations, vital signs, serum chemistries, as well as completing patient-reported outcomes including the KOOS. Adverse events and concomitant medications were recorded. MRIs of both knees were obtained during the 6 and 12-month visits.

Efficacy Analyses

All KOOS subscale scores, WOMAC Total score and subscale scores, MRI-based patello-femoral and tibiofemoral cartilage thickness, and MRI-based subchondral bone area and 3D bone shape were analyzed.

MRI images were provided to central readers for cartilage and subchondral bone measures, respectively. Central readers were blind as to treatment assignment.

3D shape of subchondral bone was analyzed using active appearance model (AAM) software developed by Imorphics (www.imorphics.com) specifically for assessing these parameters in the osteoarthritic knee.

Statistical analyses were carried out using a two-sided t-test at the 5% level of significance. The outcome variables were the differences of the change of the score of each subscale of KOOS and WOMAC, change of cartilage thickness, subchondral bone area, and 3D bone shape score ("B-score") change from baseline to 6 and 12 months in the treated knees ("Index Knees") compared with the placebo-exposed knees ("Control Knees").

Results

Clinical and Structural Efficacies in OA Knees of All Severity

In the analysis of all 93 subjects, Index knees treated with 200 mg per dose of the peptide of SEQ ID No: 10 demonstrated clinically meaningful and statistically significant (as compared to Control knees treated with saline placebo) improvements in several WOMAC and KOOS subscales and questions at 6 months, 12 months, or both time points (McGuire 2017 and McGuire 2018).

On the other hand, cartilage thickness change in neither patello-femoral nor tibiofemoral compartment showed significant difference between Index and Control knees throughout the 12-month follow-up period.

Of the 93 subjects, MRI of 78 (156 knees) had sufficient quality to provide reliable 3D bone shape (B-score) data. These subjects were re-analyzed for their clinical and knee structure parameters.

Approximately 34% of all 156 knees had gICRS 4 (the most severe) cartilage defect, all of which were in the tibiofemoral (TF) compartment. Another approximately 45% had gICRS 3 (the second most severe) cartilage defect in patello-femoral (PF) and/or TF compartments, and the remaining approximately 21% had gICRS 2 (moderate) cartilage defect in PF and/or TF compartments. There were no subjects with gICRS 1 (mild) cartilage defect. Distribution of the severity by gICRS was very similar between Index and Control knees. The mean body mass index (BMI) of all subjects exceeded 30, which is in the obese range and consistent with the average BMI for the OA population in the U.S. The average age of the subjects was 58.4 and 62% of the subjects were female. These were also consistent with the demographic of the U.S. OA population.

Treatments with peptide of SEQ ID No: 10 were safe and well tolerated. There were no severe adverse events that were related to the peptide of SEQ ID No: 10. Treatment-related adverse events were mild or moderate, transient, and common in many subjects at baseline.

The KOOS ADL (Function in Activities of Daily Living) subscale consists of 17 questions pertaining to various daily activities critical to everyday knee function. Results of the KOOS ADL domain demonstrated clinically meaningful and statistically significant ($p<0.05$) improvements over baseline in Index Knees as compared to Control Knees at both 6 and 12-month time points. See FIG. 3. The WOMAC Function subscale, which consists of the same questions as KOOS ADL, unsurprisingly also showed the same robust improvement in Index Knees as compared to Control Knees.

The KOOS Knee-related Quality of Life (QOL) subscale consists of four questions including the subjects' general difficulty with their knee and awareness of problems with confidence regarding each of their knees. The KOOS Knee-related QOL exhibited clinically meaningful and statistically significant improvement in Index knees as compared to Control knees at 12 months.

The KOOS Pain subscale and WOMAC Pain domain, respectively, demonstrated a clinically meaningful improvement in Index knees at 12 months, although the difference with Control knees did not reach statistical significance.

One of the questions making up the KOOS Pain (and WOMAC Pain) subscale queries "Pain going up or down stairs". Pain during this common activity is one of the most common complaints made by patients with knee OA and was significantly improved ($p<0.05$) in Index knees as compared to Control knees at 12 months.

Another question making up the KOOS Pain (but not WOMAC Pain) subscale queries "Pain bending knee fully" was also significantly improved ($p<0.05$) in Index knees as compared to Control knees at 12 months. "Bending knee fully" is one of the most stringent knee activities applying a large burden to the knee joint and it is required in multiple functions.

It should be noted that Index knees showed statistically significant improvements as compared to Control knees in multiple domains making up KOOS ADL and WOMAC Function subscale queries, including "Descending Stairs," "Ascending Stairs," "Bending to floor/pickup an object," "Getting in and out of Car," "Getting in and out of bath," "Getting on/off Toilet," etc. These activities particularly require more bending and force on the knees than others.

Change in 3D shape (B-score) of subchondral bone as measured by MRI was also compared between Index and Control knee groups.

Distribution of B-scores of the 78 Index knees and 78 Control knees, respectively, at the baseline was very similar to that of over 5,000 OA knees registered in the National Institutes of Health—Osteoarthritis Initiative (NIH-OAI) database. The means of the baseline B-scores of Index and Control knees were the same each other, and very similar to that of the OA knees in the NIH-OAI database. These mean that the subjects enrolled in this study well represented the U.S. knee OA population. See FIG. 1.

Pathological three-dimensional (3D) subchondral bone shape change of femur as quantified by B-score showed a statistically significant ($p<0.05$) difference in favor of Index knees as compared to Control knees at both 6 and 12 months. See FIG. 2.

Pathological 3D subchondral bone shape changes in tibia and patella also demonstrated slower increases in Index knees as compared to Control knees, but without statistical significance.

These clinical and structural data in mild to severe knee OA patients demonstrate that the peptide of SEQ ID No: 10, which selectively binds to integrin $\alpha_v\beta_3$ known to be expressed by bone lineage cells reduces pathological 3D shape changes of subchondral bone in multiple knee compartments and provides critical benefits to patients including improvements in knee function and pain.

Since it is known that the peptide of SEQ ID No: 10 (a human orthologue) and its least homologous peptide of SEQ ID No: 14 (a rat/murine orthologue) interchangeably show biological activities in the bone cells of the other species, it is reasonable to assume that a peptide sharing a consensus amino acid sequence of SEQ ID No: 1 has the same clinical and structural efficacy in a joint, in particular, in a knee joint.

Structural and Clinical Efficacies in Knees with More Severe OA

As shown in FIG. 1, distribution and mean of B-scores of the 78 Index Knees and 78 Control Knees, respectively, at baseline were very similar to those of the OA knees in the NIH-OAI database.

We analyzed structural and clinical efficacies of the peptide of SEQ ID No: 10 as compared to saline placebo in the knees with higher Baseline B-Scores.

The placebo-exposed (Control) knees in the cohorts with higher femur Baseline B-Score showed more rapid increase in their femur B-scores during the 12-month study period. For instance, Control knees in the femur Baseline B-Score ≥0.5 cohort showed faster femur B-score increase than that in the femur Baseline B-Score ≥0 cohort. Likewise, the femur B-score increase rate was higher in Baseline B-Score ≥1 cohort than ≥0.5 cohort, and Baseline B-Score ≥1.5 cohort than ≥1.0 cohort. See FIG. 4. It was consistent with the observation in the OAI-based natural history study, which showed more rapid femur B-score increase in more severe (higher B-score) knees.

On the other hand, the knees treated with the peptide of SEQ ID No: 10 (Index knees) reduced femur B-score increase rate in all cohorts with Baseline B-Score ≥0 in a very similar manner The trajectory of femur B-score change in Index knees was very similar to that of non-OA (healthy) knees in the OAI database particularly for the first 6 months after the treatment. The trajectory was increased in the second 6 months as compared to the first 6 months but femur B-score of Index knees at 12 months were maintained markedly lower than that of Control knees. See FIG. 4.

Knee function measured by KOOS Activities of Daily Living (ADL)/WOMAC Function in Index knees showed clinically meaningful improvement at 3 months after treatment, which was maintained through 6 and 12 months without additional treatment. Control knees showed improvement at 3 months, which was not clinically meaningful, but it was declined toward 6 and 12 months. Similarly to femur B-score, difference in function improvements between Index and Control knees was larger in the cohorts with higher Baseline B-Score. For example, the difference was larger in the cohort with femur Baseline B-Score ≥0.5 than that with ≥0, ≥1.0 than ≥0.5, and ≥1.5 than ≥1.0. See FIG. 5 and Table 3.

Likewise, knee pain measured by KOOS Pain subscale showed more robust improvement in Index knees as compared to Control knees in a higher femur Baseline B-Score cohort. A remarkable difference from function improvement was that statistically significant pain improvement in Index knees as compared to Control knees appeared at 12 months. See FIG. 6 and Table 3.

Most patients participated in this study had had knee OA for years. It is common that those with chronic pain, including OA patients, have changes in the nervous system due to peripheral and central pain sensitization, with signals pathologically activated with or without nociceptive stimulus (Wylde 2015). Renormalization of pain pathways after effective treatment of OA pathology (i.e., joint replacement, or slowing or arresting pathological bone shape change) may require many months to be realized in patients' appreciation of pain reduction. This may account for delayed improvement in pain scores versus earlier improvements in functional scores.

In both function and pain graphs (FIGS. 5 and 6), placebo effects were smaller in a higher Baseline B-Score cohort.

A similar pattern was observed among patella Baseline B-Score severity cohorts. A higher patella Baseline B-Score cohort showed more robust and statistically significant improvements in Index knees as compared to Control knees in clinical benefits. See FIGS. 7 and 8 as well as Table 6.

The cohorts with higher Baseline B-Scores in both femur and patella demonstrated even more robust and statistically significant function and pain improvements than those with higher Baseline B-Score in either one of femur or patella. See FIGS. 9 and 10 as well as Tables 8 and 9.

In both Index and Control knees, B-scores of femur and patella were highly correlated ($p<0.0001$) at all time points. This seems to explain why patella Baseline B-Score predicts treatment outcomes as well as femur Baseline B-Score.

Interestingly, B-score changes from baseline to 6 or 12 months showed least correlations between femur and patella. This suggests that 3D bone shape improvements in femur and patella contribute clinical improvements through different mechanisms. It is probably the reason why combining femur and patella B-Score is more predictive than one of them.

Although a less severe cohort such as the one with Baseline B-Score <0 showed limited treatment effects in the 12-month follow-up period, a long-term data exhibited a clear sign of efficacy.

FIG. 11 shows femur B-score changes of Index and Control knees with femur Baseline B-Score <0 for 30 months.

Control knees with B-Score <0 showed a very modest increase of femur B-score for the first 6 months, where the trajectory is similar to that of non-OA knees in the OAI database. The slope of the trajectory became slightly steeper between 6 and 12 months indicating slight acceleration of pathological 3D bone shape change. Then, the slope was further increased between 12 and 30 months, resembling that of OA knees from the OAI database. As described above, the worse the OA is, the faster the B-score increase becomes.

Index knees with B-Score <0 showed a similar trajectory to that of non-OA knees from the OAI database for the first 6 months, and appeared to reverse the pathological 3D bone shape change from 6 to 12 months. The slope then increased from 12 to 30 months, exceeding that of non-OA knees by 30 months.

Although not statistically significant, treatment appeared to modify the Index knees' pathological 3D bone shape change for longer than 12 months.

FIG. 12 demonstrates KOOS ADL/WOMAC Function score changes of Index and Control knees with femur Baseline B-Score <0 over the 30-month period.

While functional improvements in Index knees were not statistically significant as compared to Control knees for at 12 months, statistically significant comparative improvement was demonstrated at 30 months.

In knees with femur Baseline B-Score ≥0, both structural and clinical benefits in Index knees as compared to Control knees were no longer in evidence at 30 months, indicating that the efficacy of the single treatment series was limited to between 12 and 30 months.

REFERENCES

American Academy of Orthopaedic Surgeons. Projected volume of primary and revision total joint replacement in the U.S. 2030 to 2016. Research News released on Mar. 6, 2018.

American Academy of Orthopaedic Surgeons. Treatment of Osteoarthritis of the Knee—2nd Edition Evidence-Based Clinical Practice Guideline. Published May 18, 2013.

Barr A, Dube B, Hensor E, Kingsbury S, Peat G, Bowes M, Sharples L, Conaghan P. The relationship between three-dimensional knee MRI bone shape and total knee replacement—a case control study: data from the Osteoarthritis Initiative. *Rheumatology*. 2016; 55: 1585-1593.

Bingham C, Buckland-Wright C, Garnero P, Cohen S, Dougados M, Adami S, Clauw D, Spector T, Pelletier J, Raynauld J, Strand V, Simon L, Meyer J, Cline G, Beary J. Risedronate decreases biochemical markers of cartilage degeneration but does not decrease symptoms or slow radiographic progression in patients with medial compartment osteoarthritis of the knee. *Arthritis & Rheumatism*. 2006:54(11); 3494-3507

Bowes M, Vincent G, Wolstenholme C, Conaghan P. A novel method for bone area measurement provides new insights into osteoarthritis and its progression. *Ann Rheum Dis*. 2013; 74:519-525

Bowes M, Kacena K, Alaba O, Brett A, Bodick N, Conaghan P. Machine learning defines the relationship between structural knee osteoarthritis and Patient-Important Outcomes: An 8-year study of 47,858 knee MRIs from the Osteoarthritis Initiative (OAI). *ACR Abs*. 2019; Abs 2196

Bowes M, Kacena K, Alabas O A, Brett A D, Dube B, Bodick N, Conaghan P G. Machine-learning, MRI bone shape and important clinical outcomes in osteoarthritis: data from the Osteoarthritis Initiative. *Ann Rheum Dis*. 2020; 0:1-7. doi:10.1136/annrheumdis-2020-217160

Cohen M D. Hyaluronic acid treatment (viscosupplementation) for OA of the knee. *Bull Rheum Dis*. 1998; 47:4-7

Dube B, Bowes M, Barr A, Hensor E, Kingsbury S, Conaghan P. The relationship between two different measures of osteoarthritis bone pathology, bone marrow lesions and 3D bone shape: data from the osteoarthritis initiative. *Osteo and Cart*. 2018; 26:1333-1337

Dürsteler C, Cordero-Garcia C, Fernandez C I G, Molero J V P, Merchante I M. Assessment of diagnostic criteria for the identification of central sensitization in patients with osteoarthritis pain; Results from a Delphi survey. *Medicine* 2020; 99:52(e23470)

Erggelet C, Vavken P. Microfracture for the treatment of cartilage defects in the knee joint—A golden standard?. *Journal of Clinical Orthopaedics and Trauma* 2016; 145-152

FDA (U.S. Department of Health and Human Services, Food and Drug Administration). Osteoarthritis: Structural endpoints for the development of drugs, devices, and biological products for treatment Guidance for Industry. *DRAFT GUIDANCE* August 2018.

Greenwald J, Shafritz K. An integrated neuroscience framework for the treatment of chronic pain: From cellular alternations to behavior. *Front in Integr Neuro*. May 2018; 12(18)

Haj-Mirzaian A, Guermazi A, Roemer F W, Bowes M A, Conaghan P G, Demehri S. Bisphosphonates intake and its association with changes of periarticular bone area and three-dimensional shape: data from the osteoarthritis Initiative (OAI). *Osteo and Cart*. 2018; 26:564-568

Hayashibara T, Hiraga T, Yi B, Nomizu M, Kumagai Y, Nishimura R, Yoneda T. A synthetic peptide fragment of human MEPE stimulates new bone formation in vitro and in vivo. *JBMR*. 2004; 19:455

Hellio le Graverand M, Clemmer R, Redifer P, Brunell R, Hayes C, Brandt K, Abramson S, Manning P, Miller C, Vignon E. A 2-year randomized, double-blind, placebo-controlled, multicenter study of oral selective iNOS inhibitor, cindunistat (SD-6010), in patients with symptomatic osteoarthritis of the knee. *Ann Rheum Dis*. 2013; 72:187-195

Hochberg M C, Guermazi A, Guehring H, Aydemir A, Wax S, Fleuranceau-Morel P, Bihlet A R, Byrjalsen I, Andersen J, Eckstein F. Efficacy and safety of intra-articular Sprifermin in symptomatic radiographic knee osteoarthritis: results of the 2-year primary analysis from a 5-year randomized, placebo-controlled, Phase 2 study. *Arthr Rheum*. 2017; 69(10):1L Hochberg M, Guermazi A, Guehring H, Aydemir A, Wax S, Fleuranceau-Morel P, Bihlet A, Byrjalsen I, Andersen J, Eckstein F. Efficacy and safety of intra-articular Sprifermin in symptomatic radiographic knee osteoarthritis: pre-specified analysis of 3-year data from a 5-year randomized, placebo-controlled, Phase II study. *Osteo and Cart*. 2018; 26:S32

Hunter D, Nevitt M, Lynch J, Kraus V, Katz J, Collins J, Bowes M, Guermazi A, Roemer F, Losina E. Longitudinal validation of periarticular bone area and 3D shape as biomarkers for knee OA progression? Data from the FNIH OA Biomarkers Consortium. *Ann Rheum Dis*. 2016; 75:1607-1614

Karsdal M, Byrjalsen I, Alexandersen P, Bihlet A, Andersen J, Riis B, Bay-Jensen A, Christiansen C. Treatment of symptomatic knee osteoarthritis with oral salmon calcitonin: results from two phase 3 trials. *Osteoarthritis Cartilage*. 2015; 23(4):532

Katz N. Design and conduct of confirmatory chronic pain clinical trials. *Pain Reports Online*. 2021; 6(e854)

Krzeski P, Buckland-Wright C, Balint G, Cline G A, Stoner K, Lyon R, Beary J, Aronstein W S, Spector TD. Development of musculoskeletal toxicity without clear benefit after administration of PG-116800, a matrix metalloproteinase inhibitor, to patients with knee osteoarthritis: a randomized, 12-month, double-blind, placebo-controlled study. *Arthr Res Ther*. 2007; 9(5):R109

Laslett L L, Dore D A, Quinn S J, Boon P, Ryan E, Winzenberg T M, Jones G. Zolendronic acid reduces knee pain and bone marrow lesions over 1 year: a randomized controlled trial. *Ann Rheum Dis/*2012; 71:1322-8

Lazarov M, Shih M S, Gerome C, Blacher R, Kumagai Y, Rosen DM. AC-100, a fragment of MEPE, promotes fracture healing in a rat model. *ASBMR* 2004.

McAlindon T, LaValley M, Harvey W, Price L, Driban J, Zhang M, Ward R. Effect of Intra-articular triamcinolone vs saline on knee cartilage volume and pain in patients with knee osteoarthritis—a randomized clinical trial. *JAMA*. 2017; 317(19):1967-1975

McGuire D, Lane N, Segal N, Metyas S, Barthel H R, Miller M, Rosen D, Kumagai Y. Significant, sustained improvement in knee function after intra-articular TPX-100: A double-blind, randomized, multi-center, placebo-controlled Phase 2 trial. *Arthr Rheum*. 2017; 69(10):13L McGuire D, Segal N, Metyas S, Barthel H R, Miller M, Rosen D, Kumagai Y. Intra-articular TPX-100 in knee osteoarthritis: Robust functional response at 6 and 12 months is associated with increased tibiofemoral cartilage thickness. *Arthr Rheum.* 2018; 70(10):L16

McGuire D, Bowes M, Brett A, Segal N, Miller M, Rosen D, Kumagai Y. Intra-Articular TPX-100 significantly delays pathological bone shape change at 6 and 12 Months in moderate to severe Tibiofemoral OA. *ACR Conf* 2019; Abs 1303

McGuire D, Bowes M, Brett A, Miller M, Kumagai Y. Significant reduction in femoral bone shape change at 12 months after IA TPX-100 correlates with Tibiofemoral cartilage stabilization. *Osteo & Cart* 2020 *World Congress.* 2020; 537-538

Middleton-Hardie C, Aberman H, Alliston T, Mortazavi A, Rosen D. AC-100 Promotes cartilage defect repair In Vivo and chondrocyte differentiation and function In vivo. *ORS* 2010

Nagel D, Khosla S, Sanyal A, Rosen D, Kumagai Y, Riggs L. A fragment of hypophosphatemic factor, MEPE, required inducible Cyclooxygenase-2 to exert potent anabolic effects on normal human marrow osteoblast precursors. *J of Cell Biochem.* 2004; 93:1107-1114

Nair B. Clinical trial designs. *Indian Derm Online J.* 2019; 10(2):193-201

Neogi T, Bowes M, Niu J, De Souza K, Vincent G, Goggins J, Zhang Y, Felson D T. MRI-based three-dimensional bone shape of the knee predicts onset of knee osteoarthritis: Data from the Osteoarthritis Initiative. *Arthr Rheum.* 2013; 65(8):2048-2058

Niemeyer P, Pestka J M, Kreuz P C, Erggelet C, Schmal H, Suedkamp N P, Steinwachs M. Characteristic complications after autologous chondrocyte implantation for cartilage defects of the knee joint. *Am J Sports Med.* 2008; 36(11):2091-2099

Reginster J Y, Badurski J, Bellamy N, Bensen W, Chapurlat R, Chevalier X, Christiansen C, Genant H, Navarro F, Nasonov e, Sambrook P N, Spector T D, Cooper C. Efficacy and safety of strontium ranelate in the treatment of knee osteoarthritis: Results of a double-blind, randomized placebo-controlled trial. *Ann Rheum Dis.* 2013; 72:179-186

Reichenbach S, Guermazi A, Niu J, Neogi T, Hunter D J, Roemer F W, McLennan C E, Hernandez-Molina G, Felson D T. Prevalence of bone attrition on knee radiographs and MRI in a community-based cohort. *Oste Cart.* 2008; 16(9):1005-1010

Rosen D, Middleton-Hardie C, Aswani S, Lazarov M. AC-100, A synthetic fragment of MEPE, promotes bone formation and maturation in rodent and canine bone regeneration models. *ORS.* 2006: Oral and Poster Presentation.

Saltzman B, Leroux T, Meyer M, Basques B, Chahal J, Bach B, Yanke A, Cole B. The therapeutic effect of intra-articular normal saline injections for knee osteoarthritis. A meta-analysis of evidence Level 1 studies. *Am J of Sp Med.* 2017; 45(11):2647-2653

Six N, Septier D., Chaussain-Miller C, Blacher R, DenBesten P, Goldberg M. Dentonin, a MEPE fragment, initiates pulp-healing response to injury. *J Dent Res.* 2007; 86(8): 780-785

Wager T, Atlas L. The neuroscience of placebo effects: connecting context, learning and health. *Nat Rev/Neuro.* July 2015; 16

Williams T, Holmes A, Waterton J, Maciewicz R, Hutchinson C, Moots R, Nash A, Taylor C. Anatomically corresponded regional analysis of cartilage in asymptomatic and osteoarthritic knees by statistical shape modelling of the bone. *IEEE Trans on Med Imaging.* 2010; 29(8):1541-1559

Woolf A D, Pfleger B, Burden of major musculoskeletal conditions. *Bull of the World Health Org.* 2003; 81(9): 646-656

Wylde V, Sayers A, Lenguerrand E, Gooberman-Hill R, Pyke M, Beswick A, Dieppe P, Blom A. Preoperative widespread pain sensitization and chronic pain after hip and knee replacement: a cohort analysis. *Pain J Online.* January 2015; 156(1)

Zaslav K, Cole B, Brewster R, DeBernardo T, Farr J, Fowler P, Nissen C. A prospective study of autologous chondrocyte implantation in subjects with failed prior treatment for articular cartilage defect of the knee: Results of the study of the treatment of articular repair (STAR) clinical trial. *Am J Sports Med.* 2009; 37:42-55

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

CLAUSES

1. A method of determining responsiveness of an abnormal joint to a therapeutic intervention, comprising:
    (a) measuring three-dimensional (3D) shape of subchondral bones in a patient comprising the abnormal joint to obtain a set of measurements;
    (b) comparing the set of measurements in (a) to standard measurements of corresponding normal subchondral bone shapes and thereby obtaining a differential; and
    (c) analyzing the comparison of (b) and determining a likelihood of effective therapeutic intervention based on the differential obtained in (b).

2. The method of clause 1, further comprising:
    administering to the patient a therapeutically effective amount of a formulation which provides the therapeutic intervention thereby impacting a subchondral bone of the abnormal joint.

3. The method of clause 2, wherein the joint is abnormal due to arthritis or traumatic injury.

4. The method of any of the above clauses, wherein the therapeutic intervention delays, arrests, or reverses the pathological 3D shape change of the subchondral bone.

5. The method of any of the above clauses, wherein the therapeutic intervention is intra-articular or subcutaneous administration of any peptide having an amino acid sequence of DLXXRGDNDXXPFSGDGXXF (SEQ ID No: 1), wherein X is any amino acid.

6. The method of any of the above clauses, wherein the peptide has an amino acid sequence of TDLQERGDNDIS-PFSGDGQPFKD (SEQ ID No: 10).

7. The method of clauses 1-6, wherein the response to the therapeutic intervention provides a result selected from the group consisting of improvements of function, pain, stiffness, joint-related quality of life, and total condition of the joint.

8. The method of clause 7, wherein the improvement is measured by one or more of the subscales in the patient-reported outcomes selected from WOMAC, KOOS, VAS, or NRS.

9. The method of clause 7-8, wherein the joint suffers from one or more of osteoarthritis, joint trauma, or rheumatoid arthritis.

10. The method of clause 7-8, wherein the joint is knee joint and the 3D shape of subchondral bone is measured by B-scores of femur, patella, or both.

11. The method of clause 10, wherein the B-score of femur is ≥0, more preferably ≥0.5, further preferably ≥1, and the most preferably ≥1.5.

12. The method of clause 10, wherein the B-score of patella is ≥0, or more preferably ≥0.5.

13. The method of clause 10, wherein the B-scores of femur and patella are co-used and their thresholds are selected from ≥0 and ≥0, ≥0 and ≥0.5, ≥0.5 and ≥0, ≥0.5 and ≥0.5, ≥1.0 and ≥0, ≥1.0 and ≥0.5, ≥1.5 and ≥0, or ≥1.5 and ≥0.5, respectively, wherein the higher thresholds in both are more preferable.

14. A method of treating knee OA with a peptide of SEQ ID No: 10, comprising;
measuring B-score of femur and/or patella of the knee; and
determining the dose and treatment frequency for the knee based on its B-scores.

15. A method of patient screening for a clinical trial of osteoarthritis or trauma of the knees, comprising:
(a) measuring three-dimensional (3D) shape of knee bones in a patient to obtain a set of measurements;
(b) comparing the set of measurements in (a) to standard measurements of knee bone shapes and thereby obtaining a differential; and
(c) analyzing the comparison of (b) and
selecting a patient for treatment based on the analyzing in (c).

16. A method of treating a patient diagnosed with an abnormal joint, comprising:
(a) measuring three-dimensional (3D) shape of subchondral bones of the patient comprising the abnormal joint to obtain a set of measurements;
(b) comparing the set of measurements in (a) to standard measurements of corresponding normal subchondral bone shapes and thereby obtaining a differential;
(c) analyzing the comparison of (b) and determining a likelihood of effective therapeutic intervention based on the differential obtained in (b), and
(d) administering therapy to the patient.

17. The method of clause 16, wherein the therapy is injection of a formulation comprising a peptide having an amino acid sequence of TDLQERGDNDIS-PFSGDGQPFKD (SEQ ID No: 10).

18. The method of clause 17, wherein the injection is intra-articular or subcutaneous injection.

19. The method of clause 18, further comprising:
(e) repeating steps (a), following injecting,
comparing the measuring in (e) with measure in (a), and thereby determining a need for additional injecting.

20. A method, comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising a peptide having an amino acid sequence of TDLQERGDNDISPFSGDGQPFKD (SEQ ID No: 10).

21. A use of a peptide in treating bone, the use comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising any peptide having an amino acid sequence of DLXXRGDNDXXPFSGDGXXF (SEQ ID No: 1), wherein X is any amino acid 22. A formulation comprising of any peptide having an amino acid sequence of DLXXRGDNDXXPFSGDGXXF (SEQ ID No: 1), wherein X is any amino acid wherein the formulation is for use in a method, comprising:
(a) measuring three-dimensional (3D) shape in a patient of subchondral bones comprising the abnormal joint to obtain a plurality of measurements;
(b) comparing measurements in (a) to standard measurements of corresponding normal subchondral bone shapes and thereby obtaining a differential;
(c) analyzing the comparison of (b),
(d) thereby determining a likelihood of effective therapeutic intervention based on the differential obtained in (b); and
(e) injecting the patient with a formulation comprising any peptide having an amino acid sequence of DLXXRGDNDXXPFSGDGXXF (SEQ ID No: 1), wherein X is any amino acid.

23. A method of determining responsiveness of an abnormal joint to a therapeutic intervention, comprising:
(a) comparing a set of measurements comprising a three-dimensional (3D) shape of subchondral bones in a patient comprising the abnormal joint to standard measurements of corresponding normal subchondral bone shapes and thereby obtaining a differential; and
(b) analyzing the comparison of (a) and determining a likelihood of effective therapeutic intervention based on the differential obtained in (a).

24. The method of clause 23,
wherein the therapeutic intervention is obtainable by administering to the patient a therapeutically effective amount of a formulation thereby impacting a subchondral bone of the abnormal joint.

25. The method of clause 24, wherein the joint is abnormal due to arthritis or traumatic injury.

26. The method of any of the above clauses, wherein the therapeutic intervention delays, arrests, or reverses the pathological 3D shape change of the subchondral bone.

27. The method of clauses 23-26, wherein the response to the therapeutic intervention provides a result selected from the group consisting of improvements of function, pain, stiffness, joint-related quality of life, and total condition of the joint.

28. The method of clause 27, wherein the improvement is measured by one or more of the subscales in the patient-reported outcomes selected from WOMAC, KOOS, VAS, or NRS.

29. The method of clause 27-28, wherein the joint suffers from one or more of osteoarthritis, joint trauma, or rheumatoid arthritis.

30. The method of clause 27-28, wherein the joint is knee joint and the 3D shape of subchondral bone is measured by B-scores of femur, patella, or both.

31. The method of clause 30, wherein the B-score of femur is ≥0, more preferably ≥0.5, further preferably ≥1, and the most preferably ≥1.5.

32. The method of clause 30, wherein the B-score of patella is ≥0, or more preferably ≥0.5.

33. The method of clause 30, wherein the B-scores of femur and patella are co-used and their thresholds are selected from ≥0 and ≥0, ≥0 and ≥0.5, ≥0.5 and ≥0, ≥0.5 and ≥0.5, ≥1.0 and ≥0, ≥1.0 and ≥0.5, ≥1.5 and ≥0, or ≥1.5 and ≥0.5, respectively, wherein the higher thresholds in both are more preferable.

34. A method of patient screening for a clinical trial of osteoarthritis or trauma of the knees, comprising:

(a) comparing the set of measurements comprising a three-dimensional (3D) shape of knee bones in a patient to standard measurements of knee bone shapes and thereby obtaining a differential; and (b) analyzing the comparison of (a) and
selecting a patient for treatment based on the analyzing in (b).

35. A method, comprising:

(a) comparing measurements comprising a three-dimensional (3D) shape in a patient of subchondral bones comprising an abnormal joint to standard measurements of corresponding normal subchondral bone shapes and thereby obtaining a differential;

(b) analyzing the comparison of (a), (c) thereby determining a likelihood of effective therapeutic intervention based on the differential obtained in (a).

36. Peptide for use in a method of any of the clauses 23 to 35 for determining responsiveness of an abnormal joint to a therapeutic intervention, wherein said peptide comprises an amino acid sequence of DLXXRGDNDXXPFSGDGXXF (SEQ ID No: 1), wherein X is any amino acid.

37. Peptide for use according to clause 36, wherein the peptide has an amino acid sequence of TDLQERGDNDIS-PFSGDGQPFKD (SEQ ID No: 10).

38. Peptide of SEQ ID No: 10 for use in the treatment of a knee osteoarthritis (OA), wherein the treatment comprises;
measuring B-score of femur and/or patella of the knee; and
determining the dose and treatment frequency for the knee based on its B-scores.

The invention claimed is:

1. A method for selecting a patient with an abnormal knee joint for treatment with a peptide consisting of the amino acid sequence of SEQ ID NO: 10, comprising:
   (a) measuring three-dimensional (3D) shape of subchondral bones selected from the group consisting of a femur, a patella, and both a femur and a patella to obtain a set of measurements, in the patient;
   (b) comparing the set of measurements in (a) to standard measurements of corresponding normal subchondral bone shapes, thereby obtaining a B-score differential of the femur, patella, or both the femur and the patella; and
   (c) selecting a patient having a femur baseline B-score ≥1, a patella baseline B-score ≥0, or a femur baseline B-score ≥1 and a patella baseline B-score ≥0;
   (d) treating the selected patient with the peptide consisting of the amino acid sequence of TDLQERGDNDIS-PFSGDGOPFKD (SEQ ID NO: 10) at a dose of 50-400 mg ±20%; thereby providing to the patient in need thereof a therapeutic benefit selected from the group consisting of delaying, arresting, or reversing the pathological 3D shape change of the subchondral bone and a therapeutic improvement selected from the group consisting of improvement in function, pain, and stiffness of the abnormal knee joint,
   wherein:
   the joint is abnormal due to arthritis or traumatic injury.

2. The method of claim 1, wherein the improvement is measured by one or more of the subscales in the patient-reported outcomes selected from WOMAC, KOOS, VAS, or NRS.

3. The method of claim 1, wherein the B-score of femur is ≥1.5.

4. The method of claim 1, wherein the B-score of patella is ≥0.5.

5. The method of claim 1, wherein the B-scores of femur and patella are co-used and their thresholds are selected ≥1.0 and ≥0, ≥1.0 and ≥0.5, or ≥1.5 and ≥0.5, respectively, wherein the higher thresholds in both are more preferable.

* * * * *